(12) United States Patent
Kim et al.

(10) Patent No.: US 12,367,663 B1
(45) Date of Patent: Jul. 22, 2025

(54) METHOD FOR SELECTING TRAINING DATA TO TRAIN A DEEP LEARNING MODEL AND TRAINING DATA SELECTING DEVICE USING THE SAME

(71) Applicant: Superb AI Co., Ltd., Seoul (KR)

(72) Inventors: Kye Hyeon Kim, Seoul (KR); Hyundong Lee, Seoul (KR)

(73) Assignee: Superb AI Co., Ltd., Seoul (KR)

( * ) Notice: Subject to any disclaimer, the term of this patent is extended or adjusted under 35 U.S.C. 154(b) by 0 days.

(21) Appl. No.: 18/940,100

(22) Filed: Nov. 7, 2024

(51) Int. Cl.
- *G06V 10/774* (2022.01)
- *G06V 10/26* (2022.01)
- *G06V 10/762* (2022.01)
- *G06V 20/70* (2022.01)

(52) U.S. Cl.
CPC ............ *G06V 10/774* (2022.01); *G06V 10/26* (2022.01); *G06V 10/763* (2022.01); *G06V 20/70* (2022.01)

(58) Field of Classification Search
CPC .... G06V 10/774; G06V 10/26; G06V 10/763; G06V 20/70
See application file for complete search history.

(56) References Cited

U.S. PATENT DOCUMENTS

| | | |
|---|---|---|
| 2012/0148161 A1 | 6/2012 | Kim |
| 2016/0307072 A1* | 10/2016 | Zhou ................ G06V 10/426 |
| 2023/0029578 A1* | 2/2023 | Michiels ............ G06T 1/0021 |
| 2023/0059924 A1 | 2/2023 | Heinrich et al. |
| 2023/0111306 A1* | 4/2023 | Anand ................ G06T 7/0014 382/128 |
| 2023/0128548 A1 | 4/2023 | Sharma Mittal et al. |
| 2023/0196832 A1* | 6/2023 | Xiong ............... G06V 10/7635 382/159 |

(Continued)

FOREIGN PATENT DOCUMENTS

| | | |
|---|---|---|
| CN | 114418951 A | 4/2022 |
| JP | 2021128388 A | 9/2021 |

(Continued)

OTHER PUBLICATIONS

Hashemi et al. "A Bipartite matching based feature selection for multi label learning" Published Aug. 11, 2020. International Journal of Machine learning and Cybernetics(2021) (Year: 2020).*

(Continued)

*Primary Examiner* — Ming Y Hon
(74) *Attorney, Agent, or Firm* — Thompson Patent Law Offices PC

(57) ABSTRACT

A method for selecting training data for training a deep learning model is provided. The method includes steps of: (a) obtaining one or more individual attributes each of which corresponds to each of a plurality of training data included in total training data, and generating a bipartite graph by matching each of the plurality of training data included in the total training data with the individual attributes; and (b) selecting n training data among the total training data, by referring to the bipartite graph, wherein the n is a target number of the training data to be used for training the deep learning model, and wherein the training data selecting device selects the n training data to be used for training the deep learning model such that each cardinal number of each of the individual attributes matched with the n training data is within a predetermined deviation threshold.

26 Claims, 12 Drawing Sheets

(56) References Cited

U.S. PATENT DOCUMENTS

| | | | | |
|---|---|---|---|---|
| 2024/0119710 A1* | 4/2024 | Bhasin | ................ | G06V 10/774 |
| 2024/0144654 A1* | 5/2024 | Gurvich | ............... | G06V 10/776 |
| 2024/0265679 A1* | 8/2024 | Spick | .................. | G06V 10/774 |

FOREIGN PATENT DOCUMENTS

| | | |
|---|---|---|
| JP | 2023126130 A | 9/2023 |
| KR | 1020210019766 A | 2/2021 |

OTHER PUBLICATIONS

Office action issued by the Korean Patent Office on Jan. 20, 2025 in Application No. 10-2024-0147066, 5 pages.
Office Action issued Nov. 19, 2020 by the Japanese Patent Office in Application No. 2024-185162, 6 pages.
Extended European Search Report in related European application No. 24209352.4, dated May 9, 2025, 10 pages.

* cited by examiner

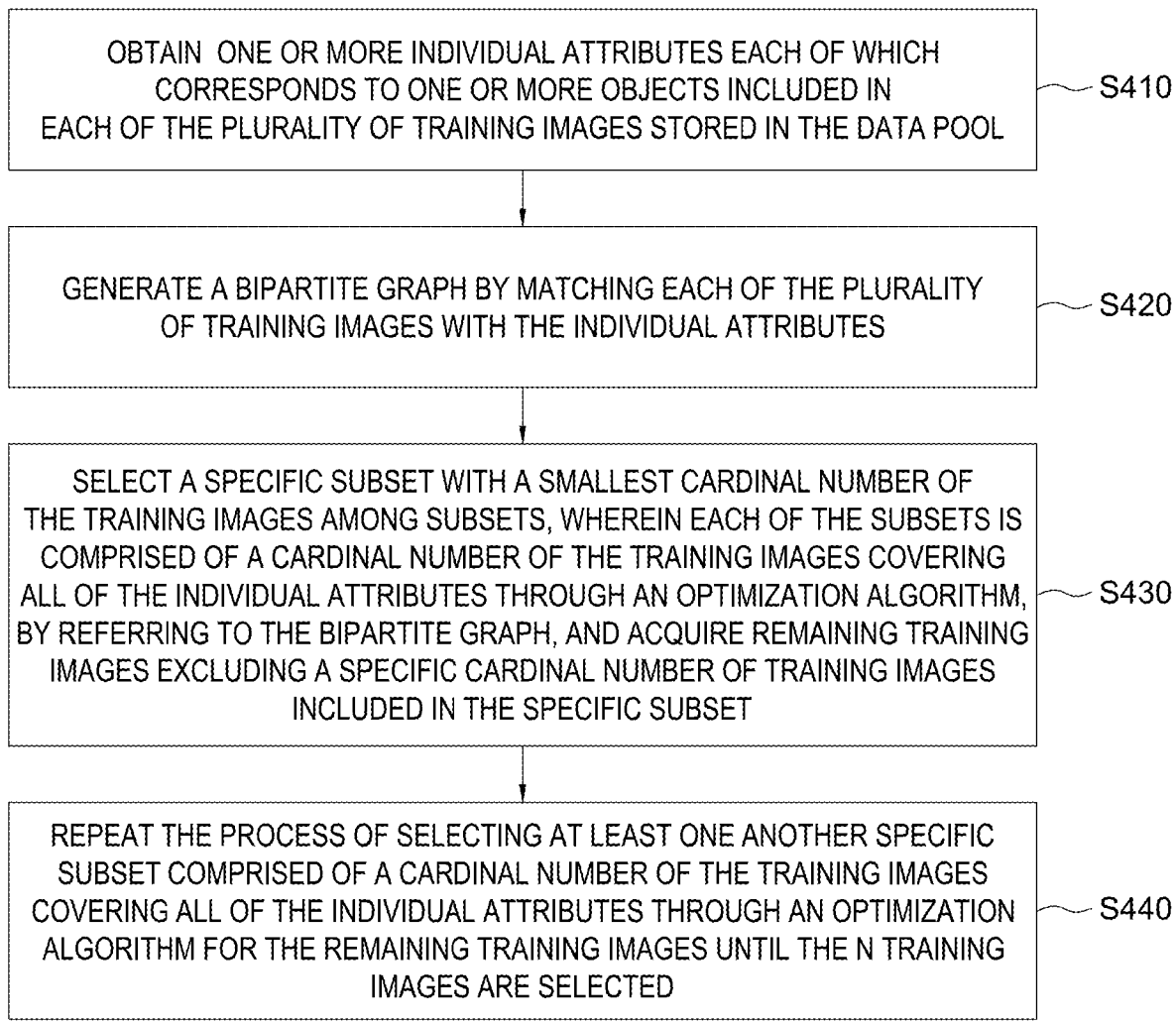

METHOD FOR SELECTING TRAINING DATA TO TRAIN A DEEP LEARNING MODEL AND TRAINING DATA SELECTING DEVICE USING THE SAME

FIELD OF THE DISCLOSURE

The present disclosure relates to a method for selecting training data, to be used for training a deep learning model, from total training data stored in a data pool evenly, without data bias and imbalance, and a training data selecting device using the same.

BACKGROUND OF THE DISCLOSURE

In general, a deep learning model may recognize complex patterns in images, texts, sounds, and other data to generate accurate insights and predictions, and may be applied in various fields such as computer vision, voice recognition, autonomous car, robotics, natural language processing, and medical image analysis.

In order for the deep learning model to accurately perform intended tasks, the deep learning model must be trained by using a large amount of training data.

Conventional methods for selecting the training data from a collected data pool include a random sampling method and a vector quantization method. In detail, the random sampling method may allow a target cardinal number of training data to be selected from total training data stored in the data pool, and the vector quantization method may allow vectors representing each of the total training data generated through an embedding extraction to be clustered and allow each of representative values for each group of the clustered vectors to be selected.

However, there are problems of attribute-specific bias and imbalance when the training data are selected by using the conventional methods.

As an example, if it is assumed that the data pool contains 1 million training images, and if it is assumed that 70% of the training images are related to a clear weather, 20% thereof are related to a cloudy weather, 5% thereof are related to a foggy weather, and 5% thereof are related to snowy and/or rainy weather, in case 10,000 training images are randomly sampled, only about 500 training images related to snowy and/or rainy weather will be randomly selected out of a total of 50,000 training images, resulting in bias and imbalance in training images selected for each of weather attributes.

In addition, in case the training images are selected by using the vector quantization method, the attribute-specific bias and imbalance of the training images selected by embedding extraction and clustering can be somewhat alleviated, but problems related to data bias and imbalance may still occur.

Therefore, the applicant of the present application proposes a method for selecting the training data to be used for training the deep learning model from the total training data stored in the data pool evenly, without data bias and imbalance.

SUMMARY OF THE DISCLOSURE

It is an object of the present disclosure for solving such conventional problems.

It is another object of the present disclosure to allow training data to be selected from a data pool evenly without being biased toward a specific attribute.

It is still another object of the present disclosure to ensure that the training data suitable for various scenarios according to various attributes of the training data are evenly selected from the data pool.

In order to accomplish objects above, representative structures of the present disclosure are described as follows:

In accordance with one aspect of the present disclosure there is provided a method for selecting training data to be used for training a deep learning model, comprising steps of: (a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and (b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold.

As one example, at the step of (b), the individual attributes include a $(1\_1)$-st individual attribute to a $(1\_x)$-th individual attribute corresponding to a first attribute type of each of the plurality of training data and a $(2\_1)$-st individual attribute to a $(2\_y)$-th individual attribute corresponding to a second attribute type of each of the plurality of training data, wherein x and y are respectively integers greater than or equal to 1, wherein the training data selecting device selects the n training data such that a cardinal number of the $(1\_1)$-st individual attribute to the $(1\_x)$-th individual attribute corresponding to the first attribute type and a cardinal number of the $(2\_1)$-st individual attribute to the $(2\_y)$-th individual attribute corresponding to the second attribute type, which are matched with the n training data, are within the predetermined deviation threshold, wherein a cardinal number of the $(1\_1)$-st individual attribute to a cardinal number of the $(1\_x)$-th individual attribute are within a first deviation threshold, and wherein a cardinal number of the $(2\_1)$-st individual attribute to a cardinal number of the $(2\_y)$-th individual attribute are within a second deviation threshold.

As one example, at the step of (b), the training data selecting device (i) checks a cardinal number of corresponding individual attributes, among the individual attributes, which are matched with each of the total training data, by referring to the bipartite graph and selects specific training data with a largest cardinal number of the corresponding individual attributes, (ii) performs a cycle of selecting partial training data which are matched with all of the individual attributes, by repeating a procedure of (ii-1) checking each of a cardinal number of remaining corresponding individual attributes, matched with each of the total training data, among remaining individual attributes, wherein the remaining individual attributes are acquired by excluding the corresponding individual attributes, and (ii-2) selecting another specific training data with a largest cardinal number of the remaining corresponding individual attributes, and (iii) performs the cycle on remaining training data excluding the partial training data from the total training data until the n training data are selected.

As one example, at the step of (b), the training data selecting device (i) selects a specific subset with a smallest cardinal number of the training data among subsets, wherein each of the subsets is comprised of a cardinal number of the training data covering all of the individual attributes through an optimization algorithm, by referring to the bipartite graph, (ii) acquires remaining training data excluding a cardinal number of training data included in the specific subset, and (iii) repeats a procedure of selecting at least one another specific subset comprised of a cardinal number of the remaining training data covering all of the individual attributes though the optimization algorithm, until n or more training data are selected.

As one example, at the step of (b), the training data selecting device (i) selects, through a linear programming, the specific subset comprised of specific training data corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection fitness variables of each of the Q training data in each of the P individual attributes, and wherein the P-dimensional vector represents the sums of fitness of the Q training data which belong to each of the P individual attributes, (ii) calculates the remaining training data excluding the specific training data included in the specific subset from the Q training data, and (iii) repeats the procedure of selecting the at least one another specific subset through the linear programming for the remaining training data, until n or more training data are selected.

As one example, at the step of (b), the training data selecting device selects the specific subset by a dual linear programming that applies at least one of merging, separating, and changing signs of constraints in the linear programming.

As one example, at the step of (b), the training data selecting device (i) selects, through an integer programming, the specific subset comprised of specific training data corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection variables of each of the Q training data in each of the P individual attributes, and wherein the P-dimensional vector represents the selection quantities of training data which belong to each of the P individual attributes, (ii) calculates the remaining training data excluding the specific training data included in the specific subset from the Q training data, and (iii) repeats the procedure of selecting the at least one another specific subset through the integer programming for the remaining training data, until n or more training data are selected.

As one example, at the step of (b), the training data selecting device selects the specific subset by a dual integer programming that applies at least one of merging, separating, and changing signs of constraints in the integer programming.

As one example, at the step of (a), the training data selecting device transmits the plurality of training data to at least one labeler terminal thereby instructing at least one labeler corresponding to the labeler terminal to generate one or more individual attributes each corresponding to each of the plurality of training data.

As one example, the total training data are training images, wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, and (ii) generates the individual attributes corresponding to the training images by referring to the first scene clusters to the k-th scene clusters.

As one example, the total training data are training images, wherein, at the step of (a), the training data selecting device (i) detects each of one or more objects from each of the training images by performing object detection on each of the training images, (ii) generates cropped images by cropping areas corresponding to bounding boxes of each of the objects detected in each of the training images, (iii) generates object vectors each of which corresponds to each of the cropped images by performing an embedding operation on each of the cropped images, (iv) generates object clusters by clustering the object vectors, and (v) generates the individual attributes corresponding to the training images by referring to the object clusters.

As one example, the total training data are training images, wherein, at the step of (a), the training data selecting device (i) generates cropped images by cropping areas corresponding to bounding boxes of each object in each of the training images by referring to each ground truth included in each of the training images, (ii) generates object vectors each of which corresponds to each of the cropped images by performing an embedding operation on each of the cropped images, (iii) generates object clusters by clustering the object vectors, and (iv) generates the individual attributes corresponding to the training images by referring to the object clusters.

As one example, the total training data are training images, wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, (ii) detects each of one or more objects from each of the training images by performing object detection on each of the training images, generates cropped images by cropping areas corresponding to bounding boxes of each of the objects detected in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

As one example, the total training data are training images, wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to generate k-th scene clusters, wherein the k is an integer greater than or equal to 1, (ii) generates cropped images by cropping areas corresponding to bounding boxes of each of the object detected in each of the training images by referring to each ground truth included in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

In accordance with another aspect of the present disclosure there is provided a training data selecting device for selecting training data to be used for training a deep learning model, comprising: at least one memory which saves instructions; and at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold.

As one example, at the process of (II), the individual attributes include a (1_1)-st individual attribute to a (1_x)-th individual attribute corresponding to a first attribute type of each of the plurality of training data and a (2_1)-st individual attribute to a (2_y)-th individual attribute corresponding to a second attribute type of each of the plurality of training data, wherein x and y are respectively integers greater than or equal to 1, wherein, at the process of (II), the processor selects the n training data such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training data, are within the predetermined deviation threshold, wherein a cardinal number of the (1_1)-st individual attribute to a cardinal number of the (1_x)-th individual attribute are within a first deviation threshold, and wherein a cardinal number of the (2_1)-st individual attribute to a cardinal number of the (2_y)-th individual attribute are within a second deviation threshold.

As one example, at the process of (II), the processor (i) checks a cardinal number of corresponding individual attributes, among the individual attributes, which are matched with each of the total training data, by referring to the bipartite graph and selects specific training data with a largest cardinal number of the corresponding individual attributes, (ii) performs a cycle of selecting partial training data which are matched with all of the individual attributes, by repeating a procedure of (ii-1) checking each of a cardinal number of remaining corresponding individual attributes, matched with each of the total training data, among remaining individual attributes, wherein the remaining individual attributes are acquired by excluding the corresponding individual attributes, and (ii-2) selecting another specific training data with a largest cardinal number of the remaining corresponding individual attributes, and (iii) performs the cycle on remaining training data excluding the partial training data from the total training data until the n training data are selected.

As one example, at the process of (II), the processor (i) selects a specific subset with a smallest cardinal number of the training data among subsets, wherein each of the subsets is comprised of a cardinal number of the training data covering all of the individual attributes through an optimization algorithm, by referring to the bipartite graph, (ii) acquires remaining training data excluding a cardinal number of training data included in the specific subset, and (iii) repeats a procedure of selecting at least one another specific subset comprised of a cardinal number of the remaining training data covering all of the individual attributes though the optimization algorithm, until n or more training data are selected.

As one example, at the process of (II), the processor (i) selects, through a linear programming, the specific subset comprised of specific training data corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection fitness variables of each of the Q training data in each of the P individual attributes, and wherein the P-dimensional vector represents the sums of fitness of the Q training data which belong to each of the P individual attributes, (ii) calculates the remaining training data excluding the specific training data included in the specific subset from the Q training data, and (iii) repeats the procedure of selecting the at least one another specific subset through the linear programming for the remaining training data, until n or more training data are selected.

As one example, at the process of (II), the processor selects the specific subset by a dual linear programming that applies at least one of merging, separating, and changing signs of constraints in the linear programming.

As one example, at the process of (II), the processor (i) selects, through an integer programming, the specific subset comprised of specific training data corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection variables of each of the Q training data in each of the P individual attributes, and wherein the P-dimensional vector represents the selection quantities of training data which belong to each of the P individual attributes, (ii) calculates the remaining training data excluding the specific training data included in the specific subset from the Q training data, and (iii) repeats the procedure of selecting the at least one another specific subset through the integer programming for the remaining training data, until n or more training data are selected.

As one example, at the process of (II), the processor selects the specific subset by a dual integer programming that applies at least one of merging, separating, and changing signs of constraints in the integer programming.

As one example, at the process of (I), the processor transmits the plurality of training data to at least one labeler terminal thereby instructing at least one labeler corresponding to the labeler terminal to generate one or more individual attributes each corresponding to each of the plurality of training data.

As one example, the total training data are training images, wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, and (ii) generates the individual attributes corresponding to the training images by referring to the first scene clusters to the k-th scene clusters.

As one example, the total training data are training images, wherein, at the process of (I), the processor (i) detects each of one or more objects from each of the training images by performing object detection on each of the training images, (ii) generates cropped images by cropping areas corresponding to bounding boxes of each of the objects detected in each of the training images, (iii) generates object vectors each of which corresponds to each of the cropped images by performing an embedding operation on each of the cropped images, (iv) generates object clusters by clustering the object vectors, and (v) generates the individual attributes corresponding to the training images by referring to the object clusters.

As one example, the total training data are training images, wherein, at the process of (I), the processor (i) generates cropped images by cropping areas corresponding to bounding boxes of each object in each of the training images by referring to each ground truth included in each of the training images, (ii) generates object vectors each of which corresponds to each of the cropped images by performing an embedding operation on each of the cropped images, (iii) generates object clusters by clustering the object vectors, and (iv) generates the individual attributes corresponding to the training images by referring to the object clusters.

As one example, the total training data are training images, wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, (ii) detects each of one or more objects from each of the training images by performing object detection on each of the training images, generates cropped images by cropping areas corresponding to bounding boxes of each of the objects detected in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

As one example, the total training data are training images, wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to generate k-th scene clusters, wherein the k is an integer greater than or equal to 1, (ii) generates cropped images by cropping areas corresponding to bounding boxes of each of the object detected in each of the training images by referring to each ground truth included in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

In addition, a cuter-readable recording medium for recording a computer program for executing the method of the present disclosure is further provided.

BRIEF DESCRIPTION OF THE DRAWINGS

The accompanying drawings used to explain example embodiments of the present disclosure are only part of example embodiments of the present disclosure and other drawings can be obtained based on the accompanying drawings by those skilled in the art of the present disclosure without inventive work.

FIG. 9 is a drawing schematically illustrating a method for selecting the training data to be used for training the deep learning model according to a fourth example embodiment of the present disclosure.

DETAILED DESCRIPTION OF THE PREFERRED EMBODIMENTS

Figure 1:
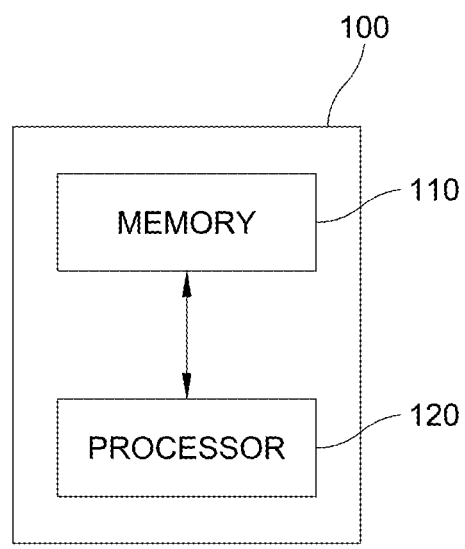
FIG. 1 is a drawing schematically illustrating a training data selecting device for selecting training data to be used for training a deep learning model.

The following detailed description of the present disclosure refers to the accompanying drawings, which show by way of illustration a specific embodiment in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached drawings in detail as shown below.

FIG. 1 is a drawing schematically illustrating a training data selecting device 100 capable of selecting training data to be used for training a deep learning model, and the training data selecting device 100 may include a memory 110 configured to store instructions for selecting the training data to be used for training the deep learning model, and a processor 120 configured to select the training data to be used for training the deep learning model according to the instructions stored in the memory 110.

Specifically, the training data selecting device 100 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network attached storage (NAS) device and a storage area network (SAN) as the computing device and any instructions that allow the computing device to function in a specific way as the computer software.

The processor 120 of the training data selecting device 100 may include hardware configuration of MPU (Micro Processing Unit) or CPU (Central Processing Unit), cache memory, data bus, etc. Additionally, the training data selecting device 100 may further include OS and software configuration of applications that achieve specific purposes.

However, the case in which the training data selecting device 100 includes an integrated processor, integrating a medium, a processor and a memory, for implementing the present disclosure is not excluded.

Meanwhile, the processor 120 of the training data selecting device 100 may perform processes of generating one or more individual attributes each of which corresponds to each of a plurality of training data included in total training data stored in a data pool and generating a bipartite graph by matching each of the plurality of training data included in the total training data with the individual attributes, according to the instructions stored in the memory 110. In addition, the processor 120 of the training data selecting device 100 may perform processes of selecting n training data, which are matched with the individual attributes, among the total training data, by referring to the bipartite graph, and selecting the n training data to be used for training the deep learning model such that each cardinal number of each of the individual attributes matched with the n training data is within a predetermined deviation threshold. The n is a target cardinal number of the training data to be used for training the deep learning model and is a plural number.

Methods for selecting the training data to be used for training the deep learning model by using the training data selecting device according to various example embodiments of the present disclosure configured as described above are as follows.

First Example Embodiment

Figure 2:
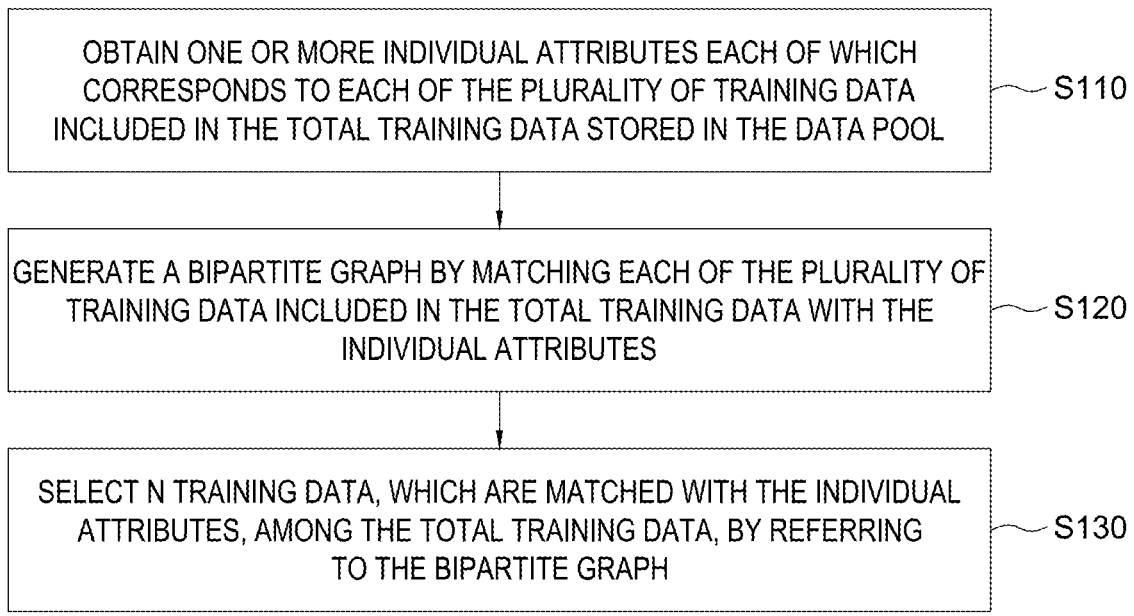
FIG. 2 is a drawing schematically illustrating a method for selecting the training data to be used for training the deep learning model according to a first example embodiment of the present disclosure.

FIG. 2 is a drawing schematically illustrating a method for selecting the training data to be used for training the deep learning model according to a first example embodiment of the present disclosure. The first example embodiment of the present disclosure referring to FIG. 2 is described as follows.

First, the training data selecting device 100 may obtain one or more individual attributes each of which corresponds to each of the plurality of training data included in the total training data stored in the data pool at a step of S110.

Herein, the individual attributes may include a (1_1)-st individual attribute to a (1_x)-th individual attribute (corresponding to a first attribute type) of each of the plurality of training data and a (2_1)-st individual attribute to a (2_y)-th individual attribute (corresponding to a second attribute type) of each of the plurality of training data, wherein x and y are respectively integers greater than or equal to 1. However, the present disclosure is not limited thereto, and may include three or more attribute types depending on characteristics of the training data.

For example, in case the training data are related to text data, the training data may be configured as having various individual attributes corresponding to various attribute types, e.g., (i) an attribute type related to genres corresponding to individual attributes such as essays, novels, reports, travelogues, and letters, etc., (ii) an attribute type related to posting platforms corresponding to individual attributes such as blogs, newspapers, and SNS posts, etc., (iii) an attribute type related to languages corresponding to individual attributes such as Korean, English, and German, etc., and (iv) an attribute type related to fields corresponding to individual attributes such as economic terms, social terms, and mathematical terms, etc.

As another example, in case the training data is related to audio data, the training data may be configured as having various individual attributes corresponding to various attribute types, e.g., (i) an attribute type related to time zone corresponding to individual attributes such as day, night, dawn, and evening etc., (ii) an attribute type related to place corresponding to individual attributes such as city, countryside, mountain and sea, etc., and (iii) an attribute type related to sound making subject corresponding to individual attributes such as car sounds, people sounds, bird sounds, and wind sounds, etc.

And as another example, in case the training data is related to image data, the training data may be configured as having various individual attributes corresponding to various attribute types, e.g., (i) an attribute type related to time zone corresponding to individual attributes such as day, night, dawn, and evening etc., (ii) an attribute type related to weather corresponding to individual attributes such as sunny, cloudy, rainy, and foggy, etc., and (iii) an attribute type related to object corresponding to individual attributes such as car, people, animal, etc.

In addition, each of the plurality of training data may be labelled with one or more individual attributes for predefined attributes manually by a labeler, or automatically by using various techniques such as AI (Artificial Intelligence) and clustering methods.

For example, the training data selecting device 100 may transmit the plurality of training data to at least one labeler terminal, thereby instructing at least one labeler corresponding to the labeler terminal to generate one or more individual attributes each of which corresponds to each of the plurality of training data.

As another example, the training data selecting device 100 may automatically generate the various individual attributes corresponding to the various attribute types of all of training images, i.e., the total training data.

Figure 3:
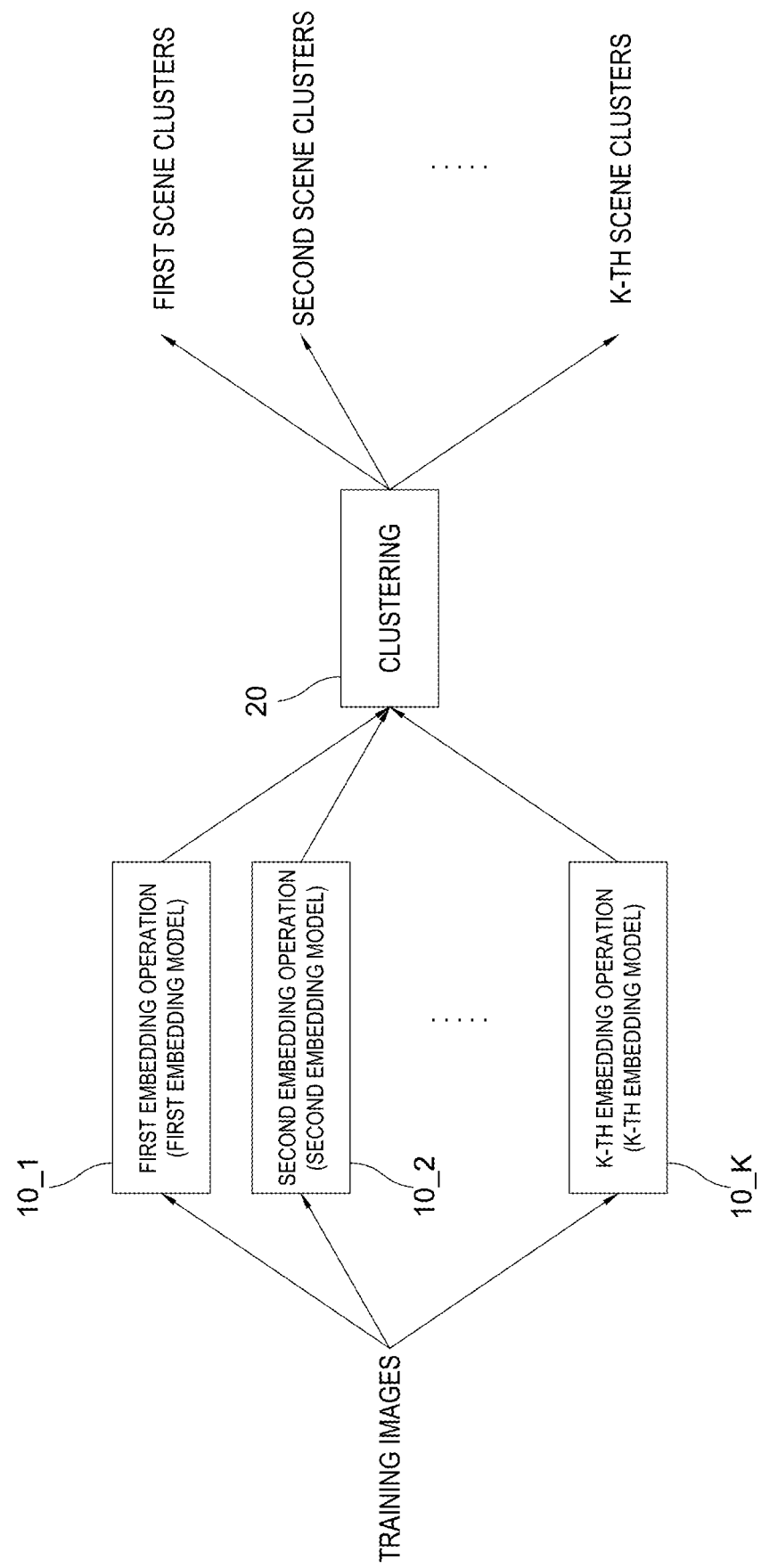
FIG. 3 is a drawing schematically illustrating an example of generating individual attributes of the training data according to the first example embodiment of the present disclosure.

That is, by referring to FIG. 3, the training data selecting device 100 (i) performs (i-1) a process of (i-1-a) performing a first embedding operation 10_1 on each of the training images to thereby generate first scene vectors each of which corresponds to each of the training images and (i-1-b) clustering 20 the first scene vectors to thereby generate first scene clusters to (i-2) a process of (i-2-a) performing a k-th embedding operation 10_k on each of the training images to thereby generate k-th scene vectors each of which corresponds to each of the training images and (i-2-b) clustering 20 the k-th scene vectors to thereby generate k-th scene clusters, wherein the k is an integer greater than or equal to 1, and (ii) generates the individual attributes corresponding to the training images by referring to the first scene clusters to the k-th scene clusters.

Herein, the training data selecting device 100 may use a visual foundation model such as CLIP (Contrastive Language-Image pre-training), DINO (self-DIstillation with NO labels), and DINOv2 for operating the first embedding operation to the k-th embedding operation. A first embedding model for the first embedding operation to a k-th embedding model for the k-th embedding operation may be different embedding models capable of generating the scene vectors each of which corresponds to each of the first attribute type to the k-th attribute type, wherein the first attribute type to the k-th attribute type are different attribute types. In addition, the training data selecting device 100 may use various clustering algorithms such as DBSCAN (Density-Based Spatial Clustering of Applications with Noise), K-Means, K-Medians, and Mean-Shift to cluster the first scene vector to the k-th scene vector.

In addition, in the above, the embedding operations and the clustering were performed on each of the training images to generate one or more individual attributes for each of the training images. However, alternatively, the individual attributes may be generated by using metadata included in each of the training images. For example, if k is 1, that is, if only individual attributes for one attribute type corresponding to each of the training images are generated through one embedding operation, individual attributes for another attribute type other than the one attribute type according to the embedding operation can be additionally generated by using the metadata of each of the training images.

That is, the individual attributes corresponding to each of the training images can be generated by checking each of the metadata included in each of the training images and by further referring to each of shooting times included in each of the metadata.

For example, in order to generate the individual attributes according to the attribute type related to time zones such as day, night, evening, dawn, etc., the training data selecting device 100 may group the training images according to preset time zones by referring to each of the shooting times of each of the training images, and may set the individual attributes related to the time zones for each of the grouped training images.

In addition, in case the training data selecting device 100 generates the individual attributes each of which corresponds to each of the training images by further referring to each of the shooting times of each of the training images, it is also possible to generate individual attributes corresponding to one attribute type using a specific embedding model and individual attributes corresponding to another attribute type using the metadata. Herein the specific embedding model is one of the first embedding model to the k-th embedding model.

That is, the training data selecting device 100 may generate specific scene vectors each of which corresponds to each of the training images by performing the specific embedding operation to each of the training images, and may generate specific scene clusters by clustering the specific scene vectors. Also, the training data selecting device 100 may check each of the shooting times of each of the training images by referring to each of the metadata corresponding to each of the training images. Thereafter, the training data selecting device 100 may generate the individual attributes corresponding to each of the training images by referring to the specific scene clusters and the shooting times.

As another example, the training data selecting device 100 may generate individual attributes corresponding to objects included in the images, other than generating various individual attributes corresponding to various attribute types for total images.

Figure 4:
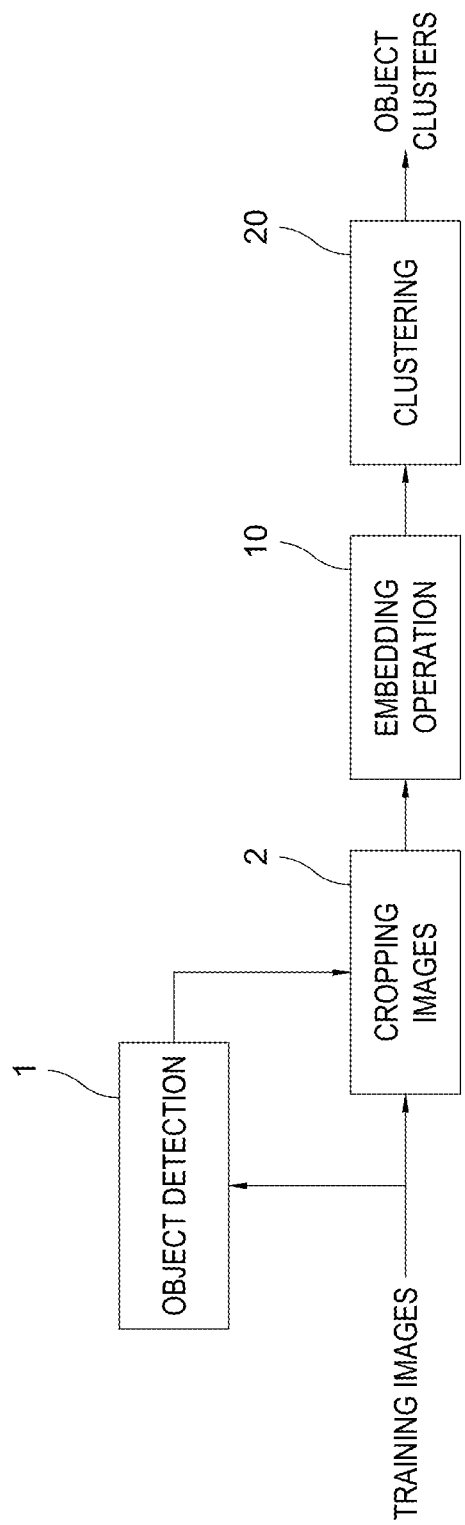
FIG. 4 is a drawing schematically illustrating another example of generating the individual attributes of the training data according to the first example embodiment of the present disclosure.

That is, by referring to FIG. 4, the training data selecting device 100 may (i) detect each of one or more objects from each of the training images by performing object detection 1 on each of the training images as the total training data, (ii) generate cropped images by cropping (indicated as 2) areas corresponding to bounding boxes of each of the objects detected in each of the training images, (iii) generate object vectors each of which corresponds to each of the cropped images by performing an embedding operation 10 on each of the cropped images, (iv) generate object clusters by clustering 20 the object vectors, and (v) generate the individual attributes corresponding to the training images by referring to the object clusters. Herein, the training data selecting device 100 may use Open-World object detection model such as Grounding DINO, OWL-ViT (short for Vision Transformer for Open-World Localization), and YOLO (You Only Look Once)-World.

Herein, the training data selecting device 100 may generate the individual attributes corresponding to the training images by further referring to the scene clusters generated as described above in addition to the object clusters.

That is, the training data selecting device 100 may (i) perform (i-1) a process of (i-1-a) performing the first embedding operation on each of the training images to thereby generate the first scene vectors each of which corresponds to each of the training images and (i-1-b) clustering the first scene vectors to thereby generate the first scene clusters to (i-2) a process of (i-2-a) performing the k-th embedding operation on each of the training images to thereby generate the k-th scene vectors each of which corresponds to each of the training images and (i-2-b) clustering the k-th scene vectors to thereby generate the k-th scene clusters, (ii) detect each of one or more objects from each of the training images by performing the object detection on each of the training images, generate the cropped images by cropping areas corresponding to the bounding boxes of each of the objects detected in each of the training images, generate the object vectors each of which corresponds to each of the cropped images by performing the embedding operation on each of the cropped images, and generate the object clusters by clustering the object vectors, and (iii) generate the individual attributes corresponding to the training images by referring to the first scene clusters to the k-th scene clusters and the object clusters.

In the above, the cropped images are generated after the object detection is performed on each of the training images. However, as another example, in case the training images are labeled with their corresponding ground truths, the cropped images can be generated by referring to the ground truths each of which corresponds to the each of the training images.

That is, the training data selecting device 100 may generate the cropped images by cropping areas corresponding to the bounding boxes of each of the objects detected in each of the training images by referring to each of the ground truths included in each of the training images, generate object vectors each of which corresponds to each of the cropped images by performing an embedding operation on each of the cropped images, generate object clusters by clustering the object vectors, and generate the individual attributes corresponding to the training images by referring to the object clusters.

Herein, the training data selecting device 100 may generate individual attributes corresponding to the training images by additionally referring to the scene clusters generated as described above in addition to the object clusters.

That is, the training data selecting device 100 may (i) perform (i-1) the process of (i-1-a) performing the first embedding operation on each of the training images to thereby generate the first scene vectors each of which corresponds to each of the training images and (i-1-b) clustering the first scene vectors to thereby generate the first scene clusters to (i-2) the process of (i-2-a) performing the k-th embedding operation on each of the training images to thereby generate the k-th scene vectors each of which corresponds to each of the training images and (i-2-b) clustering the k-th scene vectors to thereby generate the k-th scene clusters, (ii) generate the cropped images by cropping the areas corresponding to the bounding boxes of each of the objects detected in each of the training images by referring to each of the ground truths included in each of the training images, generate the object vectors each of which corresponds to each of the cropped images by performing the embedding operation on each of the cropped images, and generate the object clusters by clustering the object vectors, and (iii) generate the individual attributes corresponding to the training images by referring to the first scene clusters to the k-th scene clusters and the object clusters.

Next, by referring to FIG. 2 again, the training data selecting device 100 may generate a bipartite graph by matching each of the plurality of training data included in the total training data with the individual attributes at a step of S120.

Figure 5:
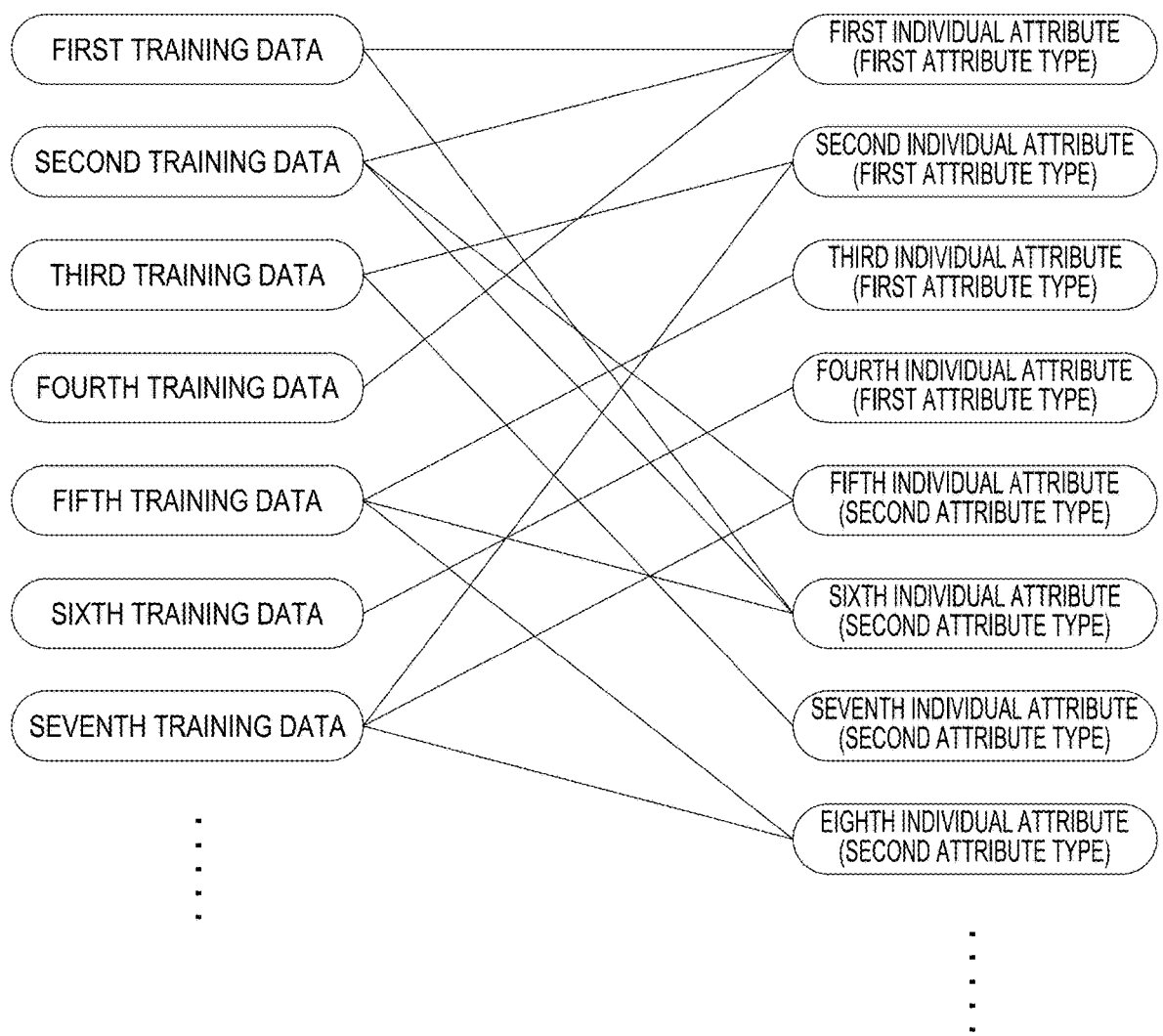
FIG. 5 is a drawing illustrating an example of a bipartite graph acquired by matching each of the training data with the individual attributes according to the first example embodiment of the present disclosure.

For example, by referring to FIG. 5, the bipartite graph matches correlations between groups of the training data and groups of the individual attributes. According to FIG. 5, a first training data matches with a first individual attribute and a sixth individual attribute, a second training data matches with the first individual attribute, a fifth individual attribute and a sixth individual attribute, a third training data matches with a second individual attribute and a seventh individual attribute, a fourth training data matches with the first individual attribute, a fifth training data matches with a third individual attribute, the sixth individual attribute and an eighth individual attribute, a sixth training data matches with a fourth individual attribute, and a seventh training data matches with the second individual attribute, the fifth individual attribute and the eighth individual attribute. Meanwhile, FIG. 5 is a drawing illustrating an example of the bipartite graph representing the correlations between some part of the training data and some part of the individual attributes.

Next, by referring to FIG. 2 again, the training data selecting device 100 may select n training data, which are matched with the individual attributes, among the total training data, by referring to the bipartite graph at a step of S130. In detail, the training data selecting device 100 selects the n training data to be used for training the deep learning model such that each cardinal number of each of the individual attributes matched with the n training data is within a predetermined deviation threshold. Herein, the n is a target number of the training data to be used for training the deep learning model and is a plural number.

Herein, if it is assumed that the individual attributes include a (1_1)-st individual attribute to a (1_x)-th individual attribute corresponding to a first attribute type of some of the plurality of training data and a (2_1)-st individual attribute to a (2_y)-th individual attribute corresponding to a second attribute type of some of the plurality of training data, the training data selecting device 100 may select the n training data such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training data, are within the predetermined deviation threshold, and such that a cardinal number of the (1_1)-st individual attribute to a cardinal number of the (1_x)-th individual attribute are within a first deviation threshold and a cardinal number of the (2_1)-st individual attribute to a cardinal number of the (2_y)-th individual attribute are within a second deviation threshold. That is, the training data selecting device 100 may select the training data such that each of cardinal numbers of the training data for each of individual attributes is as equal as possible for each of the individual attributes of each attribute type.

Meanwhile, the training data selecting device 100 may use at least some of a heuristic algorithm, an optimization algorithm, etc. in order to select each of cardinal numbers of training data for each of the individual attributes is as even as possible.

First, a process of selecting the training data using the heuristic algorithm by the training data selecting device 100 is as follows.

The training data selecting device 100 may check each cardinal number of corresponding individual attributes, among the individual attributes, which are matched with each of the total training data, by referring to the bipartite graph and select specific training data with a largest cardinal number of the corresponding individual attributes.

Also, the training data selecting device 100 may check each of cardinal numbers of remaining corresponding individual attributes, matched with each of the total training data, among remaining individual attributes, and select another specific training data with a largest cardinal number of the remaining corresponding individual attributes. Herein the remaining individual attributes are acquired by excluding the corresponding individual attributes.

The training data selecting device 100 may perform a cycle of selecting partial training data which are matched with all of the individual attributes by repeating a process of selecting training data with a largest cardinal number of the remaining corresponding individual attributes excluding the selected corresponding individual attributes.

And then, the training data selecting device 100 may repeat the process of performing the cycle on remaining training data excluding the partial training data from the total training data until the n training data are selected.

For example, by referring to FIG. 6A to FIG. 6D, since the seventh training data is matched with four individual attributes, i.e., since training data matched with the largest cardinal number of the individual attributes is the seventh training data, the training data selecting device 100 may select the seventh training data among the first training data to the seventh training data.

Figure 6A:
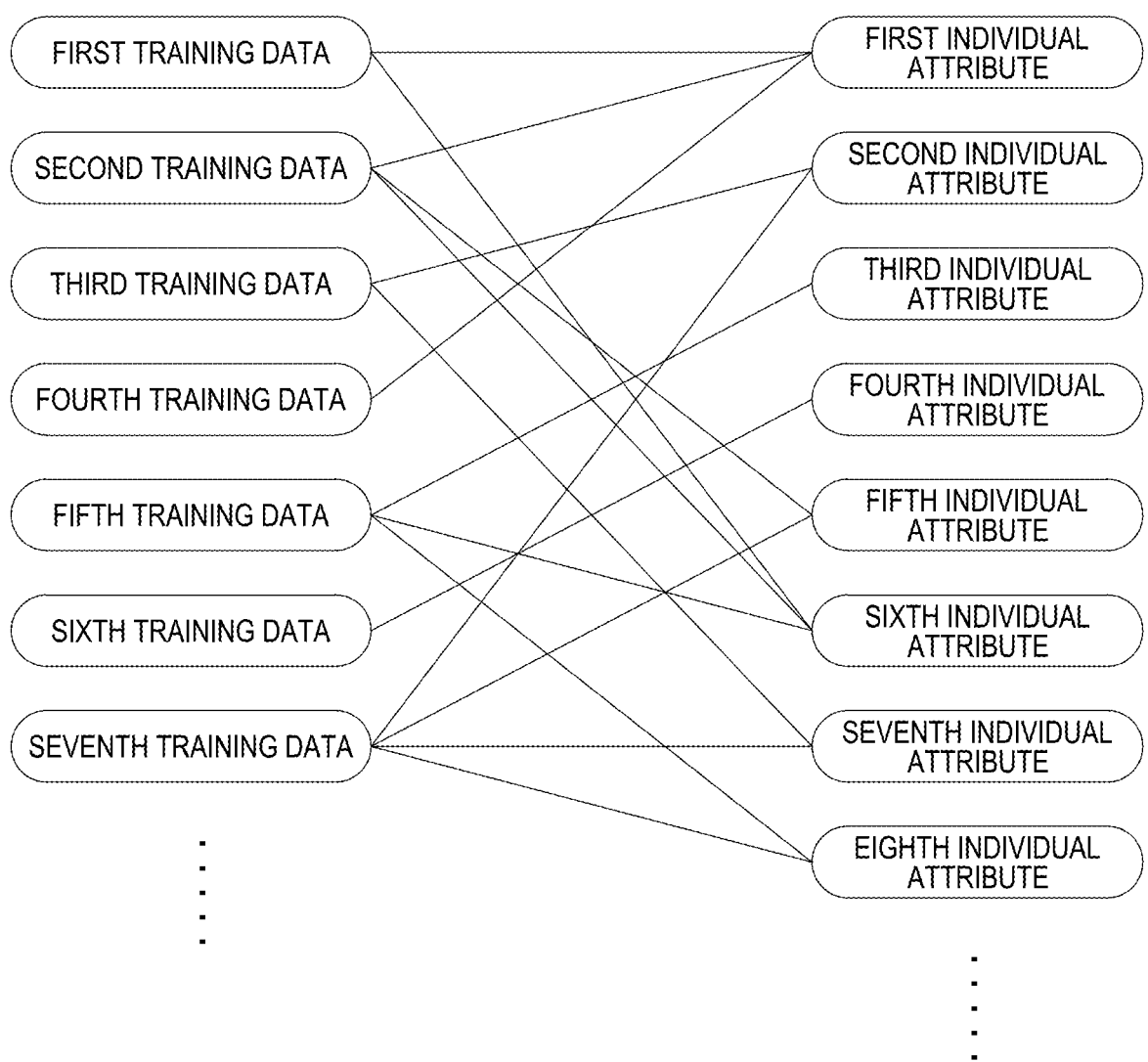
FIG. 6A to FIG. 6D are drawings schematically illustrating processes of selecting the training data with reference to the bipartite graph according to the first example embodiment of the present disclosure.
Figure 6B:
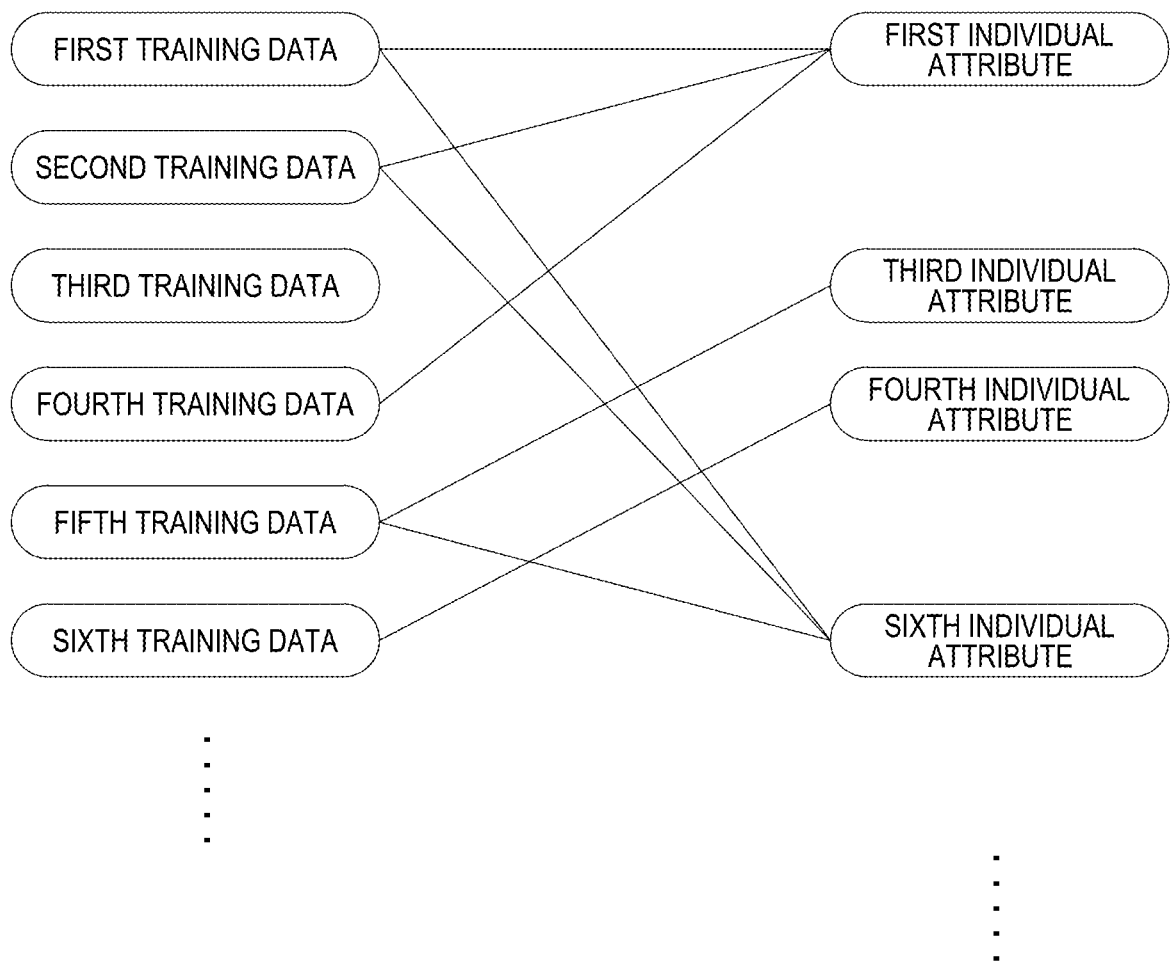

Then, the second individual attribute, the fifth individual attribute, the seventh individual attribute and the eighth individual attribute which are matched with the seventh training data are deleted from the bipartite graph in FIG. 6A, which results in an updated bipartite graph including the first individual attribute, the third individual attribute, the fourth individual attribute, and the sixth individual attribute as in FIG. 6B.

Then, since training data matched with the largest cardinal number (i.e., two) of the individual attributes are the first training data, the second training data and the fifth training data in FIG. 6B, the training data selecting device 100 may select the first training data which is one of the first training data, the second training data and the fifth training data. Herein, since there are multiple training data with the largest cardinal number of corresponding individual attribute, such as the first training data, the second training data and the fifth training data, the training data selecting device 100 may select the first training data among the multiple training data, i.e., the first training data, the second training data and the fifth training data, as specific training data, by referring to a first criterion. Herein, the first criterion can be set in various ways, such as selecting one training data among the multiple training data by a random selection algorithm, or selecting one training data according to a priority among the multiple training data.

Figure 6C:
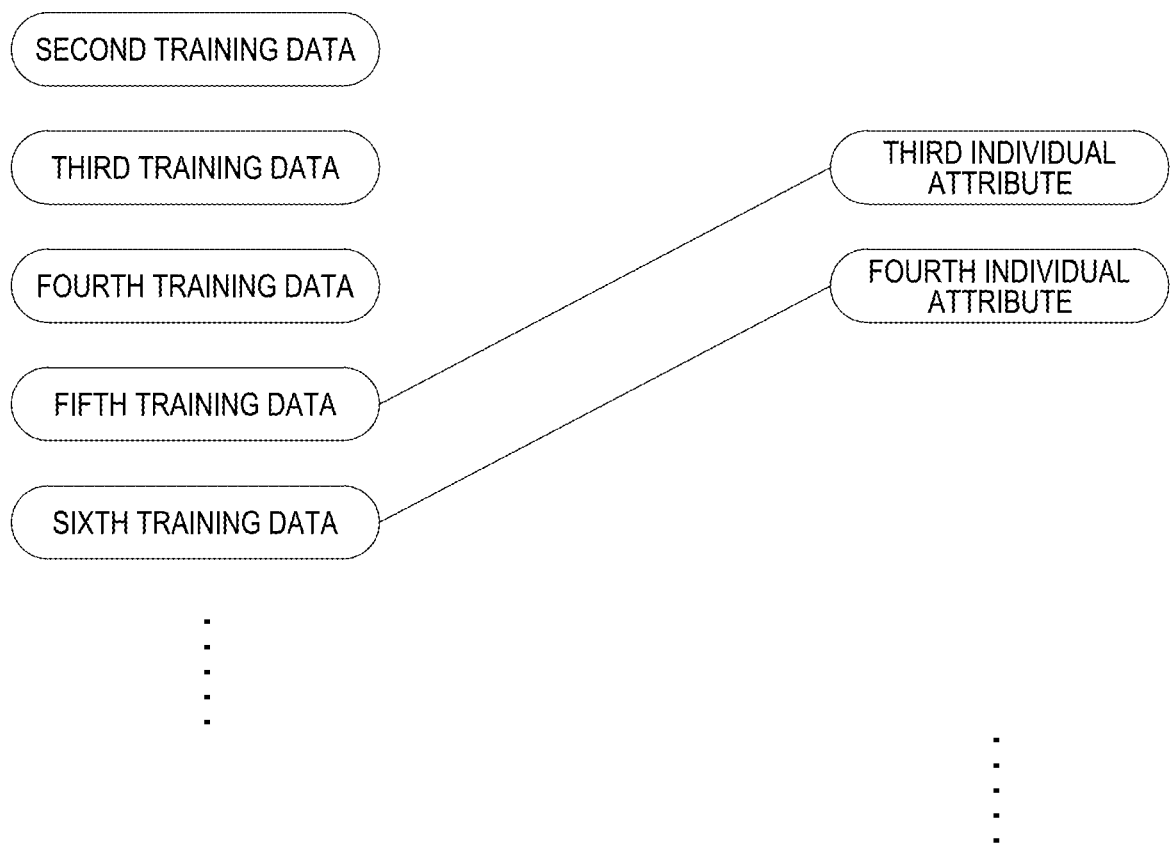

Then, the first individual attribute and the sixth individual attribute which are matched with the first training data are deleted from the bipartite graph in FIG. 6B, which results in an updated graph including the third individual attribute and the fourth individual attribute as in FIG. 6C.

Then, since training data matched with the largest cardinal number (i.e., one) of the individual attribute are the fifth training data and the sixth training data in FIG. 6C, the training data selecting device 100 may select the fifth training data which is one of the fifth training data and the sixth training data. Herein, since there are multiple training data with the largest cardinal number of corresponding individual attribute, such as the fifth training data and the sixth training data, the training data selecting device 100 may select the fifth training data among the multiple training data, i.e., fifth training data and the sixth training data, as specific training data, by referring to a second criterion. Herein, the second criterion can be set in various ways, such as selecting one training data from among the multiple training data by the random selection algorithm, or selecting one training data according to a priority among the multiple training data. Herein, the second criterion may be set as same as or different from the first criterion.

Figure 6D:
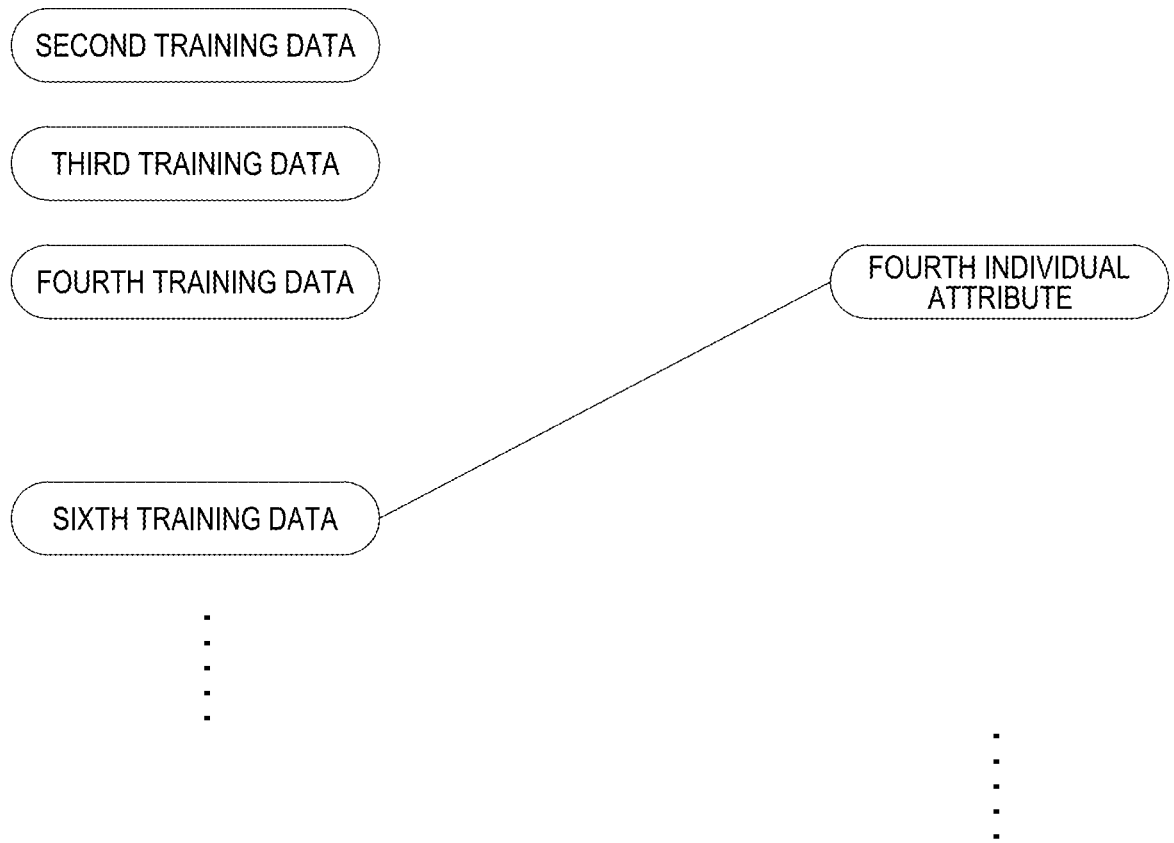

Then, the third individual attribute which is matched with the fifth training data are deleted from the bipartite graph in FIG. 6C, which results in an updated graph including the fourth individual attribute as in FIG. 6D.

Then, since training data matched with the largest cardinal number (i.e., one) of the individual attribute is the sixth training data in FIG. 6D, the training data selecting device 100 may select the sixth training data.

As mentioned above, a cycle of selecting the partial training data matched with all of the individual attributes is completed.

Thereafter, the training data selecting device 100 may repeat the cycle by using remaining training data excluding the selected partial training data, i.e., the first training data, the fifth training data, and the seventh training data, from the total training data until the n training data are selected.

Selecting the partial training data matched with all the individual attributes is described above, however, the training data can be selected by further referring to the attribute types to which each of individual attributes belong. That is, the partial training data matched with all the individual attributes belonging to all the attribute types can be selected. For example, in case the partial training data are selected from the attribute type related to a time zone like day and night and from the attribute type related to an object like car and people, the number of the partial training data matched with the individual attribute of day and the number of the partial training data matched with the individual attribute of night are selected evenly, the number of the partial training data matched with the individual attributes of day & car and the number of the partial training data matched with the individual attributes of day & people are also selected evenly, and the number of the partial training data matched with the individual attributes of night & car and the number of the partial training data matched with the individual attributes of night & people are also selected evenly.

Next, the process of selecting the training data using the optimization algorithm by the training data selecting device 100 is explained as follows.

The training data selecting device 100 may (i) select a specific subset with a smallest cardinal number of the training data among subsets, wherein each of the subsets is comprised of a cardinal number of the training data covering all of the individual attributes through an optimization algorithm, by referring to the bipartite graph, (ii) acquire remaining training data excluding a cardinal number of training data included in the specific subset, and (iii) repeat a procedure of selecting at least one another specific subset comprised of a cardinal number of the remaining training data covering all of the individual attributes though the optimization algorithm, until n or more training data are selected. Herein, the meaning of "the cardinal number of the selected training data is greater than or equal to the target number, i.e., n", does not represent that the cardinal number of the selected training data is unconditionally greater than or equal to n, but may represent that the total cardinal number of the training data finally selected does not become less than n considering the cardinal number of the specific subset lastly selected. In other words, if a previous cardinal number of the training data selected so far is less than n and a current total cardinal number of the training data, which is the sum of the previous cardinal number thereof and a current cardinal number of the training data in the specific subset currently selected, becomes greater than or equal to n, the process of selecting the training data can be terminated, and the current total cardinal number of the training data can be generated as a training data set to be used for training the deep learning model.

For example, the training data selecting device 100 may (i) select, through a linear programming as the optimization algorithm, the specific subset comprised of specific training data corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection fitness variables of each of the Q training data in each of the P individual attributes, and wherein the P-dimensional vector represents the sums of fitness of the Q training data which belong to each of the P individual attributes, (ii) calculate the remaining training data excluding the specific training data included in the specific subset from the Q training data, and (iii) repeat the procedure of selecting the at least one another specific subset through the linear programming for the remaining training data, until n or more training data are selected.

Herein, the linear programming can be indicated as follows.

Purpose: min $1^T x$

Condition: $Ax \geq 1$, $0 \leq x \leq 1$ wherein A is the P×Q binary matrix, and A[j,i] can indicate whether a training data i is matched with an individual attribute j, wherein x is the Q-dimensional vector, and x[i] can indicate the selection fitness variable of the training data i, wherein Ax is the matrix multiplication of A and x, and Ax[j] can indicate the sum of the fitness of the training data belonging to the individual attribute j.

Also, the training data selecting device 100 may select the specific subset by a dual linear programming that applies at least one of merging, separating, and changing signs of constraints in the linear programming.

The dual linear programming modified from the linear programming can be indicated as follows, but the present disclosure is not limited thereto, and the dual linear programming can be applied in various ways by modifying the constraints in the linear programming.

Purpose: min $1^T x$

Condition: $B_x \geq b$, $x \geq 0$

Herein, it can be indicated as:

$B=[A;-I], (P+Q) \times Q$ binary matrix, $B[j,i]=A[j,i]$, $B[P+i,i]=-1$ for all $i \in [1,2,\ldots,Q]$, $B[P+i,j]=0$ for all $j \neq i$ $b=[1P;-1P], (P+Q)$-dimensional vector $b[j]=1$ for all $j \in [1,2,\ldots,P]$, $b[P+i]=-1$ for all $i \in [1,2,\ldots,Q]$ For another example, the training data selecting device 100 may (i) select, through an integer programming as the optimization algorithm, the specific subset comprised of specific training data corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and a Q-dimensional vector, wherein the P×Q binary matrix corresponds to P individual attributes and Q training data in the bipartite graph, wherein the Q-dimensional vector represents the selection variables of each of the Q training data in each of the P individual attributes, and wherein the P-dimensional vector represents the selection quantities of training data which belong to each of the P individual attributes, (ii) calculate the remaining training data excluding the specific training data included in the specific subset from the Q training data, and (iii) repeat the procedure of selecting at least one another specific subset through the integer programming for the remaining training data, until n or more training data are selected.

Herein, the integer programming can be indicated as follows.

Purpose: min $1^T x$

Condition: $Ax \geq 1$, $x[i] \in \{0,1\}$ for all $i$ wherein A is the P×Q binary matrix, and A[j,i] can indicate whether a training data i is matched with an individual attribute j, wherein x is the Q-dimensional vector, and x[i] can indicate the selection variable 1 or 0 of the training data i, wherein Ax is the matrix multiplication of A and x, and Ax[j] can indicate the selection quantity of the training data belonging to the individual attribute j.

Also, the training data selecting device 100 may select the specific subset by a dual integer programming that applies at least one of merging, separating, and changing signs of constraints in the integer programming.

According to the first example embodiment of the present disclosure, it is possible to select a plurality of attribute-specific training data to be as even as possible for each of the individual attributes. In addition, in case the total training data stored in the data pool are not labeled with the ground truths, only some of the ground truths need to be labeled for some of the training data selected to be as even as possible for each attribute. Thus, the cost of generating the training data set can be reduced.

Second Example Embodiment

Figure 7:
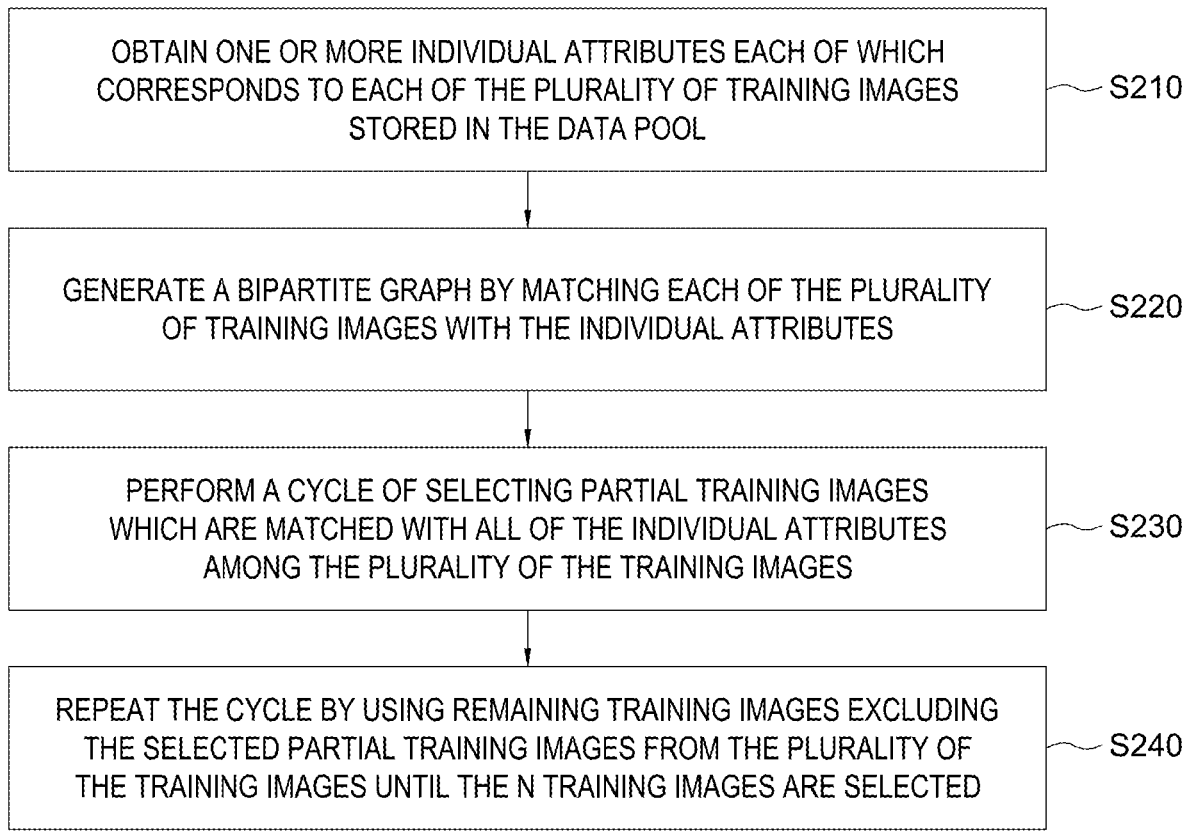
FIG. 7 is a drawing schematically illustrating a method for selecting the training data to be used for training the deep learning model according to a second example embodiment of the present disclosure.

FIG. 7 is a drawing schematically illustrating a method for selecting the training data to be used for training the deep learning model according to a second example embodiment of the present disclosure. The second example embodiment of the present disclosure referring to FIG. 7 is described as follows. For reference, detailed description of parts that can be easily understood from the description of the first example embodiment will be omitted in the following description.

First, the training data selecting device 100 may obtain one or more individual attributes each of which corresponds to each of the plurality of training images stored in the data pool at a step of S210.

Herein, the individual attributes may include the (1_1)-st individual attribute to the (1_x)-th individual attribute corresponding to the first attribute type of each of the plurality of training images and the (2_1)-st individual attribute to the (2_y)-th individual attribute corresponding to the second attribute type of each of the plurality of training images, wherein x and y are respectively integers greater than or equal to 1. However, the present disclosure is not limited thereto, and may include three or more attribute types depending on characteristics of the training images.

For example, it may be configured with various individual attributes corresponding to various attribute types, e.g., (i) an attribute type related to a time zone corresponding to individual attributes such as day, night, evening and dawn etc., (ii) an attribute type related to a weather corresponding to individual attributes such as sunny, cloudy, rainy, and foggy, etc., and (iii) an attribute type related to a place corresponding to individual attributes such as city, countryside, highway, etc.

In addition, each of the plurality of training images may be labelled with one or more individual attributes for predefined attributes manually by a labeler, or automatically by using various techniques such as AI (Artificial Intelligence) and clustering methods.

For example, the training data selecting device 100 may transmit the plurality of training images to at least one labeler terminal thereby instructing at least one labeler corresponding to the labeler terminal to generate one or more individual attributes each of which corresponds to each of the plurality of training images.

As another example, the training data selecting device 100 may automatically generate the various individual attributes corresponding to the various attribute types of all of the total images, i.e., the total training images.

That is, by referring to FIG. 3, the training data selecting device 100($i$) performs (i-1) the process of (i-1-a) performing the first embedding operation 10_1 on each of the training images to thereby generate the first scene vectors each of which corresponds to each of the training images and (i-1-b) clustering 20 the first scene vectors to thereby generate first scene clusters to (i-2) the process of (i-2-a) performing the k-th embedding operation 10_k on each of the training images to thereby generate the k-th scene vectors each of which corresponds to each of the training images and (i-2-b) clustering 20 the k-th scene vectors to thereby generate k-th scene clusters, wherein the k is an integer greater than or equal to 1, and (ii) generates the individual attributes corresponding to the training images by referring to the first scene clusters to the k-th scene clusters.

Herein, the training data selecting device 100 may use a visual foundation model such as CLIP (Contrastive Language-Image pre-training), DINO (self-DIstillation with NO labels), and DINOv2 for operating the first embedding operation to the k-th embedding operation. The first embedding model for the first embedding operation to the k-th embedding model for the k-th embedding operation may be different embedding models capable of generating the scene vectors each of which corresponds to each of the first attribute type to the k-th attribute type, wherein the first attribute type to the k-th attribute type are different attribute types. In addition, the training data selecting device 100 may use various clustering algorithms such as DBSCAN (Density-Based Spatial Clustering of Applications with Noise), K-Means, K-Medians, and Mean-Shift to cluster the first scene vector to the k-th scene vector.

In addition, in the above, the embedding operations and the clustering were performed on each of the training images to generate one or more individual attributes for each of the training images. However, alternatively, the individual attributes may be generated by using the metadata included in each of the training images. For example, if k is 1, that is, if only individual attributes for the one attribute type corresponding to each of the training images are generated through one embedding operation, individual attributes for another attribute type other than the one attribute type according to the embedding operation can be additionally generated by using the metadata of each of the training images.

That is, the individual attributes corresponding to each of the training images can be generated by checking each of the metadata included in each of the training images and by further referring to each of shooting times included in each of the metadata.

For example, in order to generate the individual attributes according to the attribute type which is related to time zones such as day, night, evening, dawn, etc., the training data selecting device 100 may group the training images according to preset time zones by referring to each of the shooting times of each of the training images, and may set the individual attributes which is related to the time zones for each of the grouped training images.

In addition, in case the training data selecting device 100 generates the individual attributes each of which corresponds to each of the training images by further referring to the shooting times of each of the training images, it is also possible to generate individual attributes corresponding to one attribute type using a specific embedding model and individual attributes corresponding to another attribute type using the metadata. Herein the specific embedding model is one of the first embedding model to k-th embedding model.

That is, the training data selecting device 100 may generate specific scene vectors each of which corresponds to each of the training images by performing the specific embedding operation to each of the training images, and may generate specific scene clusters by clustering the specific scene vectors. Also, the training data selecting device 100 may check each of the shooting times of each of the training images by referring to each of the metadata corresponding to each of the training images. Thereafter, the training data selecting device 100 may generate the individual attributes corresponding to each of the training images by referring to the specific scene clusters and the shooting times.

Next, by referring to FIG. 7 again, the training data selecting device 100 may generate a bipartite graph by matching each of the plurality of training images with the individual attributes at a step of S220.

Next, the training data selecting device 100 may perform a cycle of selecting partial training images which are matched with all of the individual attributes among the plurality of the training images at a step of S230.

That is, the training data selecting device 100 may check each cardinal number of corresponding individual attributes, among the individual attributes, which are matched with each of the plurality of the training images, by referring to the bipartite graph and select a specific training image with a largest cardinal number of the corresponding individual attributes.

Also, the training data selecting device 100 may check each of a cardinal number of remaining corresponding individual attributes, matched with each of the plurality of the training images, among remaining individual attributes, and select another specific training image with a largest cardinal number of the remaining corresponding individual attributes. Herein the remaining individual attributes are acquired by excluding the corresponding individual attributes.

The training data selecting device 100 may perform a cycle of selecting partial training images which are matched with all of the individual attributes by repeating a process of selecting training image(s) with a largest cardinal number of the remaining corresponding individual attributes excluding the selected individual attributes.

Herein, when there are multiple training images with the largest cardinal number of the corresponding individual attributes, the training data selecting device 100 may select one of the multiple training images as the specific training image by referring to the first criterion. Also, when there are multiple remaining training images with the largest cardinal number of the remaining corresponding individual attributes, the training data selecting device 100 may select one of the multiple remaining training images as the another specific training image by referring to the second criterion.

Thereafter, the training data selecting device 100 may repeat the cycle by using remaining training images until the n training images are selected at a step of S240. Herein, the remaining training images are acquired by excluding the selected partial training images from the plurality of the training images Herein, if it is assumed that the individual attributes include a (1_1)-st individual attribute to a (1_x)-th individual attribute corresponding to a first attribute type of some of the plurality of training images and a (2_1)-st individual attribute to a (2_y)-th individual attribute corresponding to a second attribute type of some of the plurality of training images, the training data selecting device 100 may select the n training images such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training images, are within the predetermined deviation threshold, and such that a cardinal number of the (1_1)-st individual attribute to a cardinal number of the (1_x)-th individual attribute are within a first deviation threshold and a cardinal number of the (2_1)-st individual attribute to a cardinal number of the (2_y)-th individual attribute are within a second deviation threshold. That is, the training data selecting device 100 may select the training images such that each of cardinal numbers of the training images for each of individual attributes is as even as possible for each of the individual attributes of each attribute type. For example, in case the partial training images are selected from the time zone attribute type related to a time zone like day and night and from the object attribute type related to an object like car and people, the number of the partial training data matched with the individual attribute of day and the number of the partial training data matched with the individual attribute of night are selected evenly, the number of the partial training data matched with the individual attributes of day & car and the number of the partial training data matched with the individual attributes of day & people are also selected evenly, and the number of the partial training data matched with the individual attributes of night & car and the number of the partial training data matched with the individual attributes of night & people are also selected evenly.

Third Example Embodiment

Figure 8:
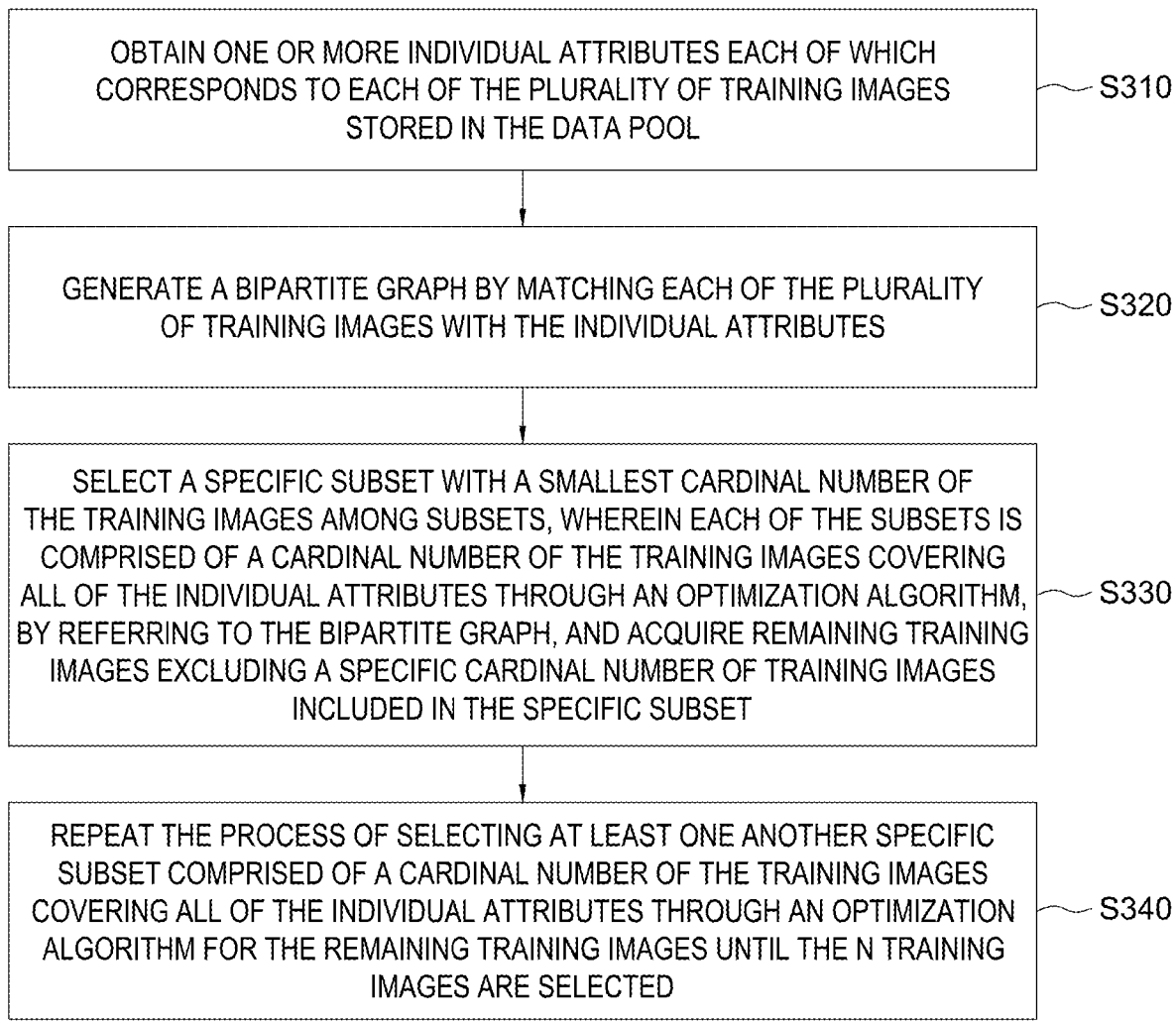
FIG. 8 is a drawing schematically illustrating a method for selecting the training data to be used for training the deep learning model according to a third example embodiment of the present disclosure.

FIG. 8 is a drawing schematically illustrating a method for selecting the training data to be used for training the deep learning model according to a third example embodiment of the present disclosure. The third example embodiment of the present disclosure referring to FIG. 8 is described as follows. For reference, detailed description of parts that can be easily understood from the description of the first example embodiment will be omitted in the following description.

First, the training data selecting device 100 may obtain one or more individual attributes each of which corresponds to each of the plurality of training images stored in the data pool at a step of S310.

Herein, the individual attributes may include the (1_1)-st individual attribute to the (1_x)-th individual attribute corresponding to the first attribute type of each of the plurality of training images and the (2_1)-st individual attribute to the (2_y)-th individual attribute corresponding to the second attribute type of each of the plurality of training images, wherein x and y are respectively integers greater than or equal to 1. However, the present disclosure is not limited thereto, and may include three or more attribute types depending on characteristics of the training images.

For example, it may be configured with various individual attributes corresponding to various attribute types, such as (i) an attribute type related to time zone corresponding to individual attributes such as day, night, evening and dawn etc., (ii) an attribute type related to weather corresponding to individual attributes such as sunny, cloudy, rainy, and foggy, etc., and (iii) an attribute type related to place corresponding to individual attributes such as city, countryside, highway, etc.

In addition, each of the plurality of training images may be labelled with one or more individual attributes for pre-defined attributes manually by a labeler, or automatically by using various techniques such as AI (Artificial Intelligence) and clustering methods.

For example, the training data selecting device 100 may transmit the plurality of training images to at least one labeler terminal thereby instructing at least one labeler corresponding to the labeler terminal to generate one or more individual attributes each of which corresponds to each of the plurality of training images.

As another example, the training data selecting device 100 may automatically generate the various individual attributes corresponding to the various attribute types of all of the training images.

That is, by referring to FIG. 3, the training data selecting device 100 (i) performs (i-1) the process of (i-1-a) performing the first embedding operation 10_1 on each of the training images to thereby generate the first scene vectors each of which corresponds to each of the training images and (i-1-b) clustering 20 the first scene vectors to thereby generate first scene clusters to (i-2) the process of (i-2-a) performing the k-th embedding operation 10_k on each of the training images to thereby generate the k-th scene vectors each of which corresponds to each of the training images and (i-2-b) clustering 20 the k-th scene vectors to thereby generate k-th scene clusters, wherein the k is an integer greater than or equal to 1, and (ii) generates the individual attributes corresponding to the training images by referring to the first scene clusters to the k-th scene clusters.

Herein, the training data selecting device 100 may use a visual foundation model such as CLIP (Contrastive Language-Image pre-training), DINO (self-DIstillation with NO labels), and DINOv2 for operating the first embedding operation to the k-th embedding operation. The first embedding model for the first embedding operation to the k-th embedding model for the k-th embedding operation may be different embedding models capable of generating the scene vectors each of which corresponds to each of the first attribute type to the k-th attribute type, wherein the first attribute type to the k-th attribute type are different attribute types. In addition, the training data selecting device 100 may use various clustering algorithms such as DBSCAN (Density-Based Spatial Clustering of Applications with Noise), K-Means, K-Medians, and Mean-Shift to cluster the first scene vector to the k-th scene vector.

In addition, in the above, the embedding operations and the clustering were performed on each of the training images to generate one or more individual attributes for each of the training images. However, alternatively, the individual attributes may be generated using the metadata included in each of the training images. For example, if k is 1, that is, if only individual attributes for the one attribute type corresponding to each of the training images are generated through one embedding operation, individual attributes for the another attribute type other than the one attribute type according to the embedding operation can be additionally generated by using the metadata of each of the training images.

That is, the individual attributes corresponding to each of the training images can be generated by checking each of the metadata included in each of the training images and by further referring to each of shooting times included in each of the metadata.

For example, in order to generate the individual attributes according to the attribute type related to time zones such as day, night, evening and dawn, etc., the training data selecting device 100 may group the training images according to preset time zones by referring to each of the shooting times of each of the training images, and may set the individual attributes related to time zones for each of the grouped training images.

In addition, in case the training data selecting device 100 generates the individual attributes each of which corresponds to each of the training images by further referring to each of the shooting times of each of the training images, it is also possible to generate individual attributes corresponding to one attribute type using a specific embedding model and individual attributes corresponding to another attribute type using the metadata. Herein the specific embedding model is one of the first embedding model to k-th embedding model, That is, the training data selecting device 100 may generate specific scene vectors each of which corresponds to each of the training images by applying a specific embedding operation to each of the training images, and may generate specific scene clusters by clustering the specific scene vectors. Also, the training data selecting device 100 may check each of the shooting times of each of the training images by referring to each of the metadata corresponding to each of the training images. Thereafter, the training data selecting device 100 may generate the individual attributes corresponding to each of the training images by referring to the specific scene clusters and the shooting times.

Next, by referring to FIG. 8 again, the training data selecting device 100 may generate a bipartite graph by matching each of the plurality of training images with the individual attributes at a step of S320.

Next, the training data selecting device 100 may select a specific subset with a smallest cardinal number of the training images among subsets, wherein each of the subsets is comprised of a cardinal number of the training images covering all of the individual attributes through an optimization algorithm, by referring to the bipartite graph, and acquire remaining training images excluding a specific cardinal number of training images included in the specific subset at a step of S330.

For example, the training data selecting device 100 may (i) select, through a linear programming as the optimization algorithm, the specific subset comprised of specific training images corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training images in the bipartite graph, wherein the Q-dimensional vector represents the selection fitness variables of each of the Q training images in each of the P individual attributes, and wherein the P-dimensional vector represents the sums of fitness of the Q training images which belong to each of the P individual attributes, (ii) calculate the remaining training images excluding the specific training images included in the specific subset from the Q training images.

Herein, the linear programming can be indicated as follows.

Purpose: min $1^T x$

Condition: Ax≥1, $0 \leq x \leq 1$ wherein A is the P×Q binary matrix, and A[j,i] can indicate whether a training image i is matched with an individual attribute j, wherein x is the Q-dimensional vector, and x[i] can indicate the selection fitness variable of the training image i, wherein Ax is the matrix multiplication of A and x, and Ax[j] can indicate the sum of the fitness of the training image belonging to individual attribute j.

Also, the training data selecting device 100 may select the specific subset by a dual linear programming that applies at least one of merging, separating, and changing signs of constraints in the linear programming.

The dual linear programming modified from the linear programming can be indicated as follows, but the present disclosure is not limited thereto, and the dual linear programming can be applied in various ways by modifying the constraints in the linear programming.

Purpose: min $1^T x$
Condition: Bx≥b, $x \geq 0$

Herein, it can be indicated as:

$B = [A; -I], (P+Q) \times Q$ binary matrix, $B[j,i] = A[j,i]$, $B[P+i, i] = -1$ for all $i \in [1,2, \ldots, Q]$, $B[P+i, j] = 0$ for all $j \neq i$ $b = [1P; -1P], (P+Q)$-dimensional vector $b[j] = 1$ for all $j \in [1, 2, \ldots, P]$, $b[P+i] = -1$ for all $i \in [1, 2, \ldots, Q]$ For another example, the training data selecting device 100 may (i) select, through an integer programming as the optimization algorithm, the specific subset comprised of specific training images corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training images in the bipartite graph, wherein the Q-dimensional vector represents the selection variables of each of the Q training images in each of the P individual attributes, and wherein the P-dimensional vector represents the selection quantities of training images which belong to each of the P individual attributes, (ii) calculate the remaining training images excluding the specific training images included in the specific subset from the Q training images.

Herein, the integer programming can be indicated as follows.

Purpose: min $1^T x$
Condition: Ax≥1, $x[i] \in \{0,1\}$ for all $i$ wherein A is the P×Q binary matrix, and A[j,i] can indicate whether a training image i is matched with an individual attribute j, wherein x is the Q-dimensional vector, and x[i] can indicate the selection variable 1 or 0 of the training image i, wherein Ax is the matrix multiplication of A and x, and Ax[j] can indicate the selection quantity of the training image belonging to individual attribute j.

Also, the training data selecting device 100 may select the specific subset by a dual integer programming that applies at least one of merging, separating, and changing signs of constraints in the integer programming.

Thereafter, the training data selecting device 100 may repeat the process of selecting at least one another specific subset comprised of a cardinal number of the training images covering all of the individual attributes through an optimization algorithm for the remaining training images until the n training images are selected at a step of S340.

Herein, if it is assumed that the individual attributes include a (1_1)-st individual attribute to a (1_x)-th individual attribute corresponding to a first attribute type of some of the plurality of training images and a (2_1)-st individual attribute to a (2_y)-th individual attribute corresponding to a second attribute type of some of the plurality of training images, the training data selecting device 100 may select the n training images such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training images, are within the predetermined deviation threshold, and such that a cardinal number of the (1_1)-st individual attribute to a cardinal number of the (1_x)-th individual attribute are within a first deviation threshold and a cardinal number of the (2_1)-st individual attribute to a cardinal number of the (2_y)-th individual attribute are within a second deviation threshold. That is, the training data selecting device 100 may select the training images such that each of the cardinal numbers of the training images for each of individual attributes is as even as possible for each of the individual attributes of each attribute type. For example, in case the partial training data are selected from the attribute type related to a time zone like day and night and from the attribute type related to an object like car and people, the number of the partial training data matched with the individual attribute of day and the number of the partial training data matched with the individual attribute of night are selected evenly, the number of the partial training data matched with the individual attributes of day & car and the number of the partial training data matched with the individual attributes of day & people are also selected evenly, and the number of the partial training data matched with the individual attributes of night & car and the number of the partial training data matched with the individual attributes of night & people are also selected evenly.

Fourth Example Embodiment

FIG. 9 is a drawing schematically illustrating a method for selecting the training data to be used for training the deep learning model according to a fourth example embodiment of the present disclosure. The fourth example embodiment of the present disclosure referring to FIG. 9 is described as follows. For reference, detailed description of parts that can be easily understood from the description of the first example embodiment will be omitted in the following description.

First, the training data selecting device 100 may obtain one or more individual attributes each of which corresponds to one or more objects included in each of the plurality of training images stored in the data pool at a step of S410.

Herein, each of the plurality of training images may be labelled with one or more individual attributes for predefined attributes manually by a labeler, or automatically by using various techniques such as AI (Artificial Intelligence) and clustering methods.

For example, the training data selecting device 100 may transmit the plurality of training images to at least one labeler terminal thereby instructing at least one labeler corresponding to the labeler terminal to generate one or more individual attributes each of which corresponds to each of the objects.

As another example, the training data selecting device 100 may automatically generate various individual attributes corresponding to each of the objects included in each of training images.

That is, by referring to FIG. 4, the training data selecting device 100 may (i) detect each of one or more objects from each of the training images by performing object detection 1 on each of the training images, (ii) generate cropped images by cropping (indicated as 2) areas corresponding to bounding boxes of each of the objects detected in each of the training images, (iii) generate object vectors each of which corresponds to each of the cropped images by performing an embedding operation 10 on each of the cropped images, (iv) generate object clusters by clustering 20 the object vectors, and (v) generate the individual attributes corresponding to the training images by referring to the object clusters. Herein, the training data selecting device 100 may use Open-World object detection model such as Grounding DINO, OWL-ViT (short for Vision Transformer for Open-World Localization), and YOLO (You Only Look Once)-World.

Herein, the training data selecting device 100 may generate the individual attributes corresponding to each of the training images by checking each of the metadata included in each of the training images, and by further referring to each of the shooting times included in each of the metadata.

In the above, the object detection is performed on each of the training images and then the cropped images are generated. However, as another example, in case the training images are labeled with their corresponding ground truths, the cropped images can be generated by referring to the ground truths each of which corresponds to each of the training images.

That is, the training data selecting device 100 may generate the cropped images by cropping areas corresponding to the bounding boxes of each of the objects detected in each of the training images by referring to each of the ground truths included in each of the training images, generate object vectors each of which corresponds to each of the cropped images by performing an embedding operation on each of the cropped images, generate object clusters by clustering the object vectors, and generate the individual attributes corresponding to the training images by referring to the object clusters.

Next, by referring to FIG. 9 again, the training data selecting device 100 may generate a bipartite graph by matching each of the plurality of training images with the individual attributes at a step of S420.

Next, the training data selecting device 100 may select a specific subset with a smallest cardinal number of the training images among subsets, wherein each of the subsets is comprised of a cardinal number of the training images covering all of the individual attributes through an optimization algorithm, by referring to the bipartite graph, and acquire remaining training images excluding a specific cardinal number of the training images included in the specific subset at a step of S430.

For example, the training data selecting device 100 may (i) select, through a linear programming as the optimization algorithm, the specific subset comprised of specific training images corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training images in the bipartite graph, wherein the Q-dimensional vector represents the selection fitness variables of each of the Q training images in each of the P individual attributes, and wherein the P-dimensional vector represents the sums of fitness of the Q training images which belong to each of the P individual attributes, (ii) calculate the remaining training images excluding the specific training images included in the specific subset from the Q training images.

Herein, the linear programming can be indicated as follows.

Purpose: min $1^T x$
Condition: $Ax \geq 1$, $$0 \leq x \leq 1$$

wherein A is the P×Q binary matrix, and A[j,i] can indicate whether a training image i is matched with an individual attribute j, wherein x is the Q-dimensional vector, and x[i] can indicate the selection fitness variable of the training image i, wherein Ax is the matrix multiplication of A and x, and Ax[j] can indicate the sum of the fitness of the training image belonging to the individual attribute j.

Also, the training data selecting device 100 may select the specific subset by a dual linear programming that applies at least one of merging, separating, and changing signs of constraints in the linear programming.

The dual linear programming modified from the linear programming can be indicated as follows, but the present disclosure is not limited thereto, and the dual linear programming can be applied in various ways by modifying the constraints in the linear programming.

Purpose: min $1^T x$
Condition: $Bx \geq b$, $$x \geq 0$$

Herein, it can be indicated as:

$$B = [A; -I], (P+Q) \times Q \text{ binary matrix},$$

$$B[j, i] = A[j, i],$$

$$B[P+i, i] = -1 \text{ for all } i \in [1, 2, \ldots, Q],$$

$$B[P+i, j] = 0 \text{ for all } j \neq i$$

$b=[1P;-1P],(P+Q)$-dimensional vector $b[j]=1$ for all $j \in [1,2,\ldots,P]$, $b[P+i]=-1$ for all $i \in [1,2,\ldots,Q]$ For another example, the training data selecting device 100 may (i) select, through an integer programming as the optimization algorithm, the specific subset comprised of specific training images corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training images in the bipartite graph, wherein the Q-dimensional vector represents the selection variables of each of the Q training images in each of the P individual attributes, and wherein the P-dimensional vector represents the selection quantities of training images which belong to each of the P individual attributes, (ii) calculate the remaining training images excluding the specific training images included in the specific subset from the Q training images.

Herein, the integer programming can be indicated as follows.

Purpose: min $1^T x$
Condition: $Ax \geq 1$, $x[i] \in \{0,1\}$ for all $i$ wherein A is the P×Q binary matrix, and A[j,i] can indicate whether a training image i is matched with an individual attribute j,
  wherein x is the Q-dimensional vector, and x[i] can indicate the selection variable 1 or 0 of the training image i,
  wherein Ax is the matrix multiplication of A and x, and Ax[j] can indicate the selection quantity of the training image belonging to individual attribute j.

Also, the training data selecting device 100 may select the specific subset by a dual integer programming that applies at least one of merging, separating, and changing signs of constraints in the integer programming.

Thereafter, the training data selecting device 100 may repeat the process of selecting at least one another specific subset comprised of a cardinal number of the training images covering all of the individual attributes through an optimization algorithm for the remaining training images until the n training images are selected at a step of S440.

According to one example embodiment of the present disclosure, it is an effect of the present disclosure to allow training data to be selected from a data pool evenly and without being biased toward a specific attribute.

According to another example embodiment of the present disclosure, it is still another effect of the present disclosure to ensure that the training data suitable for various scenarios according to attributes of the training data are evenly selected from the data pool.

The embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for selecting training data to be used for training a deep learning model, comprising steps of:
   (a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
   (b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold;
   wherein, at the step of (b), the individual attributes include a (1_1)-st individual attribute to a (1_x)-th individual attribute corresponding to a first attribute type of each of the plurality of training data and a (2_1)-st individual attribute to a (2_y)-th individual attribute corresponding to a second attribute type of each of the plurality of training data, wherein x and y are respectively integers greater than or equal to 1,
   wherein the training data selecting device selects the n training data such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training data, are within the predetermined deviation threshold, wherein a cardinal number of the (1_1)-st individual attribute to a cardinal number of the (1_x)-th individual attribute are within a first deviation threshold, and wherein a cardinal number of the (2_1)-st individual attribute to a cardinal number of the (2_y)-th individual attribute are within a second deviation threshold.

2. A method for selecting training data to be used for training a deep learning model, comprising steps of:
- (a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
- (b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein, at the step of (b), the training data selecting device (i) checks a cardinal number of corresponding individual attributes, among the individual attributes, which are matched with each of the total training data, by referring to the bipartite graph and selects specific training data with a largest cardinal number of the corresponding individual attributes, (ii) performs a cycle of selecting partial training data which are matched with all of the individual attributes, by repeating a procedure of (ii-1) checking each of a cardinal number of remaining corresponding individual attributes, matched with each of the total training data, among remaining individual attributes, wherein the remaining individual attributes are acquired by excluding the corresponding individual attributes, and (ii-2) selecting another specific training data with a largest cardinal number of the remaining corresponding individual attributes, and (iii) performs the cycle on remaining training data excluding the partial training data from the total training data until the n training data are selected.

3. A method for selecting training data to be used for training a deep learning model, comprising steps of:
- (a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
- (b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein, at the step of (b), the training data selecting device (i) selects a specific subset with a smallest cardinal number of the training data among subsets, wherein each of the subsets is comprised of a cardinal number of the training data covering all of the individual attributes through an optimization algorithm, by referring to the bipartite graph, (ii) acquires remaining training data excluding a cardinal number of training data included in the specific subset, and (iii) repeats a procedure of selecting at least one another specific subset comprised of a cardinal number of the remaining training data covering all of the individual attributes though the optimization algorithm, until n or more training data are selected.

4. The method of claim 3, wherein, at the step of (b), the training data selecting device (i) selects, through a linear programming, the specific subset comprised of specific training data corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection fitness variables of each of the Q training data in each of the P individual attributes, and wherein the P-dimensional vector represents the sums of fitness of the Q training data which belong to each of the P individual attributes, (ii) calculates the remaining training data excluding the specific training data included in the specific subset from the Q training data, and (iii) repeats the procedure of selecting the at least one another specific subset through the linear programming for the remaining training data, until n or more training data are selected.

5. The method of claim 4, wherein, at the step of (b), the training data selecting device selects the specific subset by a dual linear programming that applies at least one of merging, separating, and changing signs of constraints in the linear programming.

6. The method of claim 3, wherein, at the step of (b), the training data selecting device (i) selects, through an integer programming, the specific subset comprised of specific training data corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection variables of each of the Q training data in each of the P individual attributes, and wherein the P-dimensional vector represents the selection quantities of training data which belong to each of the P individual attributes, (ii) calculates the remaining training data excluding the specific training data included in the specific subset from the Q training data, and (iii) repeats the procedure of selecting the at least one another specific subset through the integer programming for the remaining training data, until n or more training data are selected.

7. The method of claim 6, wherein, at the step of (b), the training data selecting device selects the specific subset by a dual integer programming that applies at least one of merging, separating, and changing signs of constraints in the integer programming.

8. The method of claim 1, wherein, at the step of (a), the training data selecting device transmits the plurality of training data to at least one labeler terminal thereby instructing at least one labeler corresponding to the labeler terminal to generate the individual attributes each corresponding to each of the plurality of training data.

9. A method for selecting training data to be used for training a deep learning model, comprising steps of:
(a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
(b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein the total training data are training images,
wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, and (ii) generates the individual attributes corresponding to the training images by referring to the first scene clusters to the k-th scene clusters.

10. A method for selecting training data to be used for training a deep learning model, comprising steps of:
(a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
(b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein the total training data are training images,
wherein, at the step of (a), the training data selecting device (i) detects each of one or more objects from each of the training images by performing object detection on each of the training images, (ii) generates cropped images by cropping areas corresponding to bounding boxes of each of the objects detected in each of the training images, (iii) generates object vectors each of which corresponds to each of the cropped images by performing an embedding operation on each of the cropped images, (iv) generates object clusters by clustering the object vectors, and (v) generates the individual attributes corresponding to the training images by referring to the object clusters.

11. A method for selecting training data to be used for training a deep learning model, comprising steps of:
(a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
(b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold,
wherein the total training data are training images,
wherein, at the step of (a), the training data selecting device (i) generates cropped images by cropping areas corresponding to bounding boxes of each object in each of the training images by referring to each ground truth included in each of the training images, (ii) generates object vectors each of which corresponds to each of the cropped images by performing an embedding operation on each of the cropped images, (iii) generates object clusters by clustering the object vectors, and (iv) generates the individual attributes corresponding to the training images by referring to the object clusters.

12. A method for selecting training data to be used for training a deep learning model, comprising steps of:
(a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
(b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein the total training data are training images, wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, (ii) detects each of one or more objects from each of the training images by performing object detection on each of the training images, generates cropped images by cropping areas corresponding to bounding boxes of each of the objects detected in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

13. A method for selecting training data to be used for training a deep learning model, comprising steps of:
  (a) obtaining, by a training data selecting device, one or more individual attributes each of which corresponds to each of a plurality of training data included in total training data stored in a data pool, and generating, by the training data selecting device, a bipartite graph by matching each of the plurality of training data included in the total training data with the individual attributes; and
  (b) selecting, by the training data selecting device, n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein the total training data are training images,
  wherein, at the step of (a), the training data selecting device (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to generate k-th scene clusters, wherein the k is an integer greater than or equal to 1, (ii) generates cropped images by cropping areas corresponding to bounding boxes of each of the object detected in each of the training images by referring to each ground truth included in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

14. A training data selecting device for selecting training data to be used for training a deep learning model, comprising:
  at least one memory which saves instructions; and
  at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold;
  at the process of (II), the individual attributes include a (1_1)-st individual attribute to a (1_x)-th individual attribute corresponding to a first attribute type of each of the plurality of training data and a (2_1)-st individual attribute to a (2_y)-th individual attribute corresponding to a second attribute type of each of the plurality of training data, wherein x and y are respectively integers greater than or equal to 1, wherein, at the process of (II), the processor selects the n training data such that a cardinal number of the (1_1)-st individual attribute to the (1_x)-th individual attribute corresponding to the first attribute type and a cardinal number of the (2_1)-st individual attribute to the (2_y)-th individual attribute corresponding to the second attribute type, which are matched with the n training data, are within the predetermined deviation threshold, wherein a cardinal number of the (1_1)-st individual attribute to a cardinal number of the (1_x)-th individual attribute are within a first deviation threshold, and wherein a cardinal number of the (2_1)-st individual attribute to a cardinal number of the (2_y)-th individual attribute are within a second deviation threshold.

15. A training data selecting device for selecting training data to be used for training a deep learning model, comprising:
  at least one memory which saves instructions; and
  at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein, at the process of (II), the processor (i) checks a cardinal number of corresponding individual attributes, among the individual attributes, which are matched with each of the total training data, by referring to the bipartite graph and selects specific training data with a largest cardinal number of the corresponding individual attributes, (ii) performs a cycle of selecting partial training data which are matched with all of the individual attributes, by repeating a procedure of (ii-1) checking each of a cardinal number of remaining corresponding individual attributes, matched with each of the total training data, among remaining individual attributes, wherein the remaining individual attributes are acquired by excluding the corresponding individual attributes, and (ii-2) selecting another specific training data with a largest cardinal number of the remaining corresponding individual attributes, and (iii) performs the cycle on remaining training data excluding the partial training data from the total training data until the n training data are selected.

16. A training data selecting device for selecting training data to be used for training a deep learning model, comprising:

at least one memory which saves instructions; and at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, wherein, at the process of (II), the processor (i) selects a specific subset with a smallest cardinal number of the training data among subsets, wherein each of the subsets is comprised of a cardinal number of the training data covering all of the individual attributes through an optimization algorithm, by referring to the bipartite graph, (ii) acquires remaining training data excluding a cardinal number of training data included in the specific subset, and (iii) repeats a procedure of selecting at least one another specific subset comprised of a cardinal number of the remaining training data covering all of the individual attributes though the optimization algorithm, until n or more training data are selected.

17. The training data selecting device of claim 16, wherein, at the process of (II), the processor (i) selects, through a linear programming, the specific subset comprised of specific training data corresponding to specific selection fitness variables with a sum thereof having a minimum value, among selection fitness variables of a Q-dimensional vector which satisfy conditions: (1) sums of fitness in a P-dimensional vector are 1 or more, and (2) the selection fitness variables in the Q-dimensional vector are greater than or equal to 0 and less than or equal to 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection fitness variables of each of the Q training data in each of the P individual attributes, and wherein the P-dimensional vector represents the sums of fitness of the Q training data which belong to each of the P individual attributes, (ii) calculates the remaining training data excluding the specific training data included in the specific subset from the Q training data, and (iii) repeats the procedure of selecting the at least one another specific subset through the linear programming for the remaining training data, until n or more training data are selected.

18. The training data selecting device of claim 17, wherein, at the process of (II), the processor selects the specific subset by a dual linear programming that applies at least one of merging, separating, and changing signs of constraints in the linear programming.

19. The training data selecting device of claim 16, wherein, at the process of (II), the processor (i) selects, through an integer programming, the specific subset comprised of specific training data corresponding to specific selection variables with a sum thereof having a minimum value, among selection variables in a Q-dimensional vector which satisfy conditions: (1) selection quantities in a P-dimensional vector are 1 or more, and (2) the selection variables in the Q-dimensional vector are equal to 0 or 1, wherein the P-dimensional vector is generated by matrix multiplication of a P×Q binary matrix and the Q-dimensional vector, wherein the P×Q binary matrix corresponds to P individual attributes and Q training data in the bipartite graph, wherein the Q-dimensional vector represents the selection variables of each of the Q training data in each of the P individual attributes, and wherein the P-dimensional vector represents the selection quantities of training data which belong to each of the P individual attributes, (ii) calculates the remaining training data excluding the specific training data included in the specific subset from the Q training data, and (iii) repeats the procedure of selecting the at least one another specific subset through the integer programming for the remaining training data, until n or more training data are selected.

20. The training data selecting device of claim 19, wherein, at the process of (II), the processor selects the specific subset by a dual integer programming that applies at least one of merging, separating, and changing signs of constraints in the integer programming.

21. The training data selecting device of claim 14, wherein, at the process of (I), the processor transmits the plurality of training data to at least one labeler terminal thereby instructing at least one labeler corresponding to the labeler terminal to generate the individual attributes each corresponding to each of the plurality of training data.

22. A training data selecting device for selecting training data to be used for training a deep learning model, comprising:
at least one memory which saves instructions; and
at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold,
wherein the total training data are training images,
wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, and (ii) generates the individual attributes corresponding to the training images by referring to the first scene clusters to the k-th scene clusters.

23. A training data selecting device for selecting training data to be used for training a deep learning model, comprising:
at least one memory which saves instructions; and
at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold,
The training data selecting device of claim 14, wherein the total training data are training images,
wherein, at the process of (I), the processor (i) detects each of one or more objects from each of the training images by performing object detection on each of the training images, (ii) generates cropped images by cropping areas corresponding to bounding boxes of each of the objects detected in each of the training images, (iii) generates object vectors each of which corresponds to each of the cropped images by performing an embedding operation on each of the cropped images, (iv) generates object clusters by clustering the object vectors, and (v) generates the individual attributes corresponding to the training images by referring to the object clusters.

24. A training data selecting device for selecting training data to be used for training a deep learning model, comprising:
at least one memory which saves instructions; and
at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold,
The training data selecting device of claim 14, wherein the total training data are training images,
wherein, at the process of (I), the processor (i) generates cropped images by cropping areas corresponding to bounding boxes of each object in each of the training images by referring to each ground truth included in each of the training images, (ii) generates object vectors each of which corresponds to each of the cropped images by performing an embedding operation on each of the cropped images, (iii) generates object clusters by clustering the object vectors, and (iv) generates the individual attributes corresponding to the training images by referring to the object clusters.

25. A training data selecting device for selecting training data to be used for training a deep learning model, comprising:
at least one memory which saves instructions; and
at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold,
The training data selecting device of claim 14, wherein the total training data are training images, wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to thereby generate k-th scene clusters, wherein the k is an integer greater than or equal to 1, (ii) detects each of one or more objects from each of the training images by performing object detection on each of the training images, generates cropped images by cropping areas corresponding to bounding boxes of each of the objects detected in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

26. A training data selecting device for selecting training data to be used for training a deep learning model, comprising:
  at least one memory which saves instructions; and
  at least one processor configured to execute the instructions to perform processes of: (I) obtaining one or more individual attributes each of which corresponds to each of a plurality of training data included in total training data stored in a data pool, and generating a bipartite graph by matching each of the plurality of training data included in the total training data with the individual attributes; and (II) selecting n training data, which are matched with the individual attributes, among the total training data, by referring to the bipartite graph, wherein the n is a target number of the training data to be used for training the deep learning model and is a plural number, and wherein the training data selecting device selects the n training data to be used for training the deep learning model such that each cardinal number of each of the individual attributes matched with the n training data is within a predetermined deviation threshold, The training data selecting device of claim 14, wherein the total training data are training images, wherein, at the process of (I), the processor (i) performs (i-1) a process of (i-1-a) performing a first embedding operation on each of the training images to thereby generate first scene vectors each of which corresponds to each of the training images and (i-1-b) clustering the first scene vectors to thereby generate first scene clusters to (i-2) a process of (i-2-a) performing a k-th embedding operation on each of the training images to thereby generate k-th scene vectors each of which corresponds to each of the training images and (i-2-b) clustering the k-th scene vectors to generate k-th scene clusters, wherein the k is an integer greater than or equal to 1, (ii) generates cropped images by cropping areas corresponding to bounding boxes of each of the object detected in each of the training images by referring to each ground truth included in each of the training images, generates object vectors each of which corresponds to each of the cropped images by performing an embedding operation on each of the cropped images, and generates object clusters by clustering the object vectors, and (iii) generates the individual attributes corresponding to the training images by referring to the first scene clusters to the k-th scene clusters and the object clusters.

* * * * *